US012812729B2

(12) United States Patent
Jeong et al.

(10) Patent No.: US 12,812,729 B2
(45) Date of Patent: Nov. 24, 2026

(54) METHOD AND DEVICE RELATED TO CHANGING SYSTEM INFORMATION IN NEXT GENERATION MOBILE COMMUNICATION SYSTEM

(71) Applicant: Samsung Electronics Co., Ltd., Gyeonggi-do (KR)

(72) Inventors: Seungbeom Jeong, Gyeonggi-do (KR); Anil Agiwal, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 294 days.

(21) Appl. No.: 18/707,396

(22) PCT Filed: Dec. 23, 2022

(86) PCT No.: PCT/KR2022/021157

§ 371 (c)(1),
(2) Date: May 3, 2024

(87) PCT Pub. No.: WO2023/128480

PCT Pub. Date: Jul. 6, 2023

(65) Prior Publication Data

US 2025/0024553 A1 Jan. 16, 2025

(30) Foreign Application Priority Data

Dec. 30, 2021 (KR) ........................ 10-2021-0192087

(51) Int. Cl.
*H04W 76/28* (2018.01)
*H04W 68/00* (2009.01)

(52) U.S. Cl.
CPC ......... *H04W 76/28* (2018.02); *H04W 68/005* (2013.01)

(58) Field of Classification Search
CPC ... H04W 76/28; H04W 68/005; H04W 68/00; H04W 68/02; H04W 48/12
See application file for complete search history.

(56) References Cited

U.S. PATENT DOCUMENTS

2014/0307603 A1 10/2014 Barany
2016/0295504 A1* 10/2016 Wang .................... H04W 68/02
(Continued)

FOREIGN PATENT DOCUMENTS

KR 10-2013-0126403 11/2013
KR 10-2015-0143770 12/2015
(Continued)

OTHER PUBLICATIONS

PCT/ISA/210 Search Report dated Mar. 21, 2023, issued on PCT/KR2022/021157, pp. 5.
(Continued)

*Primary Examiner* — Jamal Javaid

(74) *Attorney, Agent, or Firm* — The Farrell Law Firm, P.C.

(57) ABSTRACT

The present disclosure relates to a 5G or 6G communication system for supporting higher transmission rates. The present disclosure relates to a method of a UE in a wireless communication system, the method comprising receiving a paging message, in case that an extended discontinuous reception (eDRX) is configured in the UE, comparing a length of a discontinuous reception (DRX) cycle currently used by the UE and a length of a modification period (MP) and in case that the length of the DRX cycle is not longer than the length of the MP, and a short message contains an indicator related to a system information update, starting a procedure for acquiring system information from a next MP.

12 Claims, 14 Drawing Sheets

(56) References Cited

U.S. PATENT DOCUMENTS

2017/0006659 A1* 1/2017 Jha .................... H04W 28/082
2017/0048841 A1* 2/2017 Hwang ............... H04L 27/3483
2017/0048842 A1 2/2017 Han et al.
2017/0127470 A1 5/2017 Vasapeyam et al.
2021/0227620 A1 7/2021 Pan et al.

FOREIGN PATENT DOCUMENTS

KR 10-2021-0095062 7/2021
KR 10-2023-0057107 4/2023
WO WO-2018105899 A1 * 6/2018 ............ H04W 48/12

OTHER PUBLICATIONS

PCT/ISA/237 Written Opinion dated Mar. 21, 2023, issued on PCT/KR2022/021157, pp. 4.
3GPP TS 36.331 V16.6.0 (Sep. 2021), pp. 1091.

* cited by examiner

METHOD AND DEVICE RELATED TO CHANGING SYSTEM INFORMATION IN NEXT GENERATION MOBILE COMMUNICATION SYSTEM

PRIORITY

This application is a National Phase Entry of PCT International Application No. PCT/KR2022/021157, which was filed on Dec. 23, 2022, and claims priority to Korean Patent Application No. 10-2021-0192087, which was filed on Dec. 30, 2021, the entire content of each of which is incorporated herein by reference.

TECHNICAL FIELD

The disclosure relates to a communication method in a next generation mobile communication system. In addition, the disclosure relates to processing of system information in a next generation mobile communication system.

BACKGROUND ART 5G mobile communication technologies define broad frequency bands such that high transmission rates and new services are possible, and can be implemented not only in “Sub 6 GHz” bands such as 3.5 GHz, but also in “Above 6 GHz” bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR), and the like, 5G performance improvement and complexity reduction by utilizing Artificial Intelligence (AI) and Machine Learning (ML), AI service support, metaverse service support, and drone communication. Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next generation distributed computing technology for implementing services at levels of complexity exceeding the limit of UE operation capability by utilizing ultra-high-performance communication and computing resources.

DISCLOSURE OF INVENTION

Technical Problem

The technical problem to be solved in embodiments of the disclosure is to provide an improved communication method in a next generation mobile communication system.

Additionally, the technical problem to be solved in embodiments of the disclosure is to provide an improved method for processing system information in a next generation mobile communication system and provide a device for performing the same.

Solution to Problem

According to an embodiment of the disclosure to solve the above problems, a method of a UE in a wireless communication system includes receiving a paging message, in case that an extended discontinuous reception (eDRX) is config ured in the UE, comparing a length of a discontinuous reception (DRX) cy cle currently used by the UE and a length of a modification period (MP) and in case that the length of the DRX cycle is not longer than the length of the MP, and a short message contains an indicator related to a system information update, starting a procedure for acquiring system information from a next MP.

In addition, according to an embodiment of the disclosure, a UE in a wireless communication system includes a transceiver and a controller. The controller controls to receive a paging message, in case that an extended discontinuous reception (eDRX) is configured in the UE, to compare a length of a disco ntinuous reception (DRX) cycle currently used by the UE and a length of a modification period (MP), and in case that the length of the DRX cycle is not longer than the length of the MP, and a short message contains an indicator related to a system information update, to start a procedure for acquiring system information from a next MP.

The technical problems to be solved in embodiments of the disclosure are not limited to those mentioned above, and other technical problems not mentioned will be clearly understood by those skilled in the art from the following description.

Advantageous Effects of Invention

According to the disclosure, a method for processing system information in a next generation mobile communication system and a device for performing the same can be provided.

MODE FOR THE INVENTION

Figure 1:
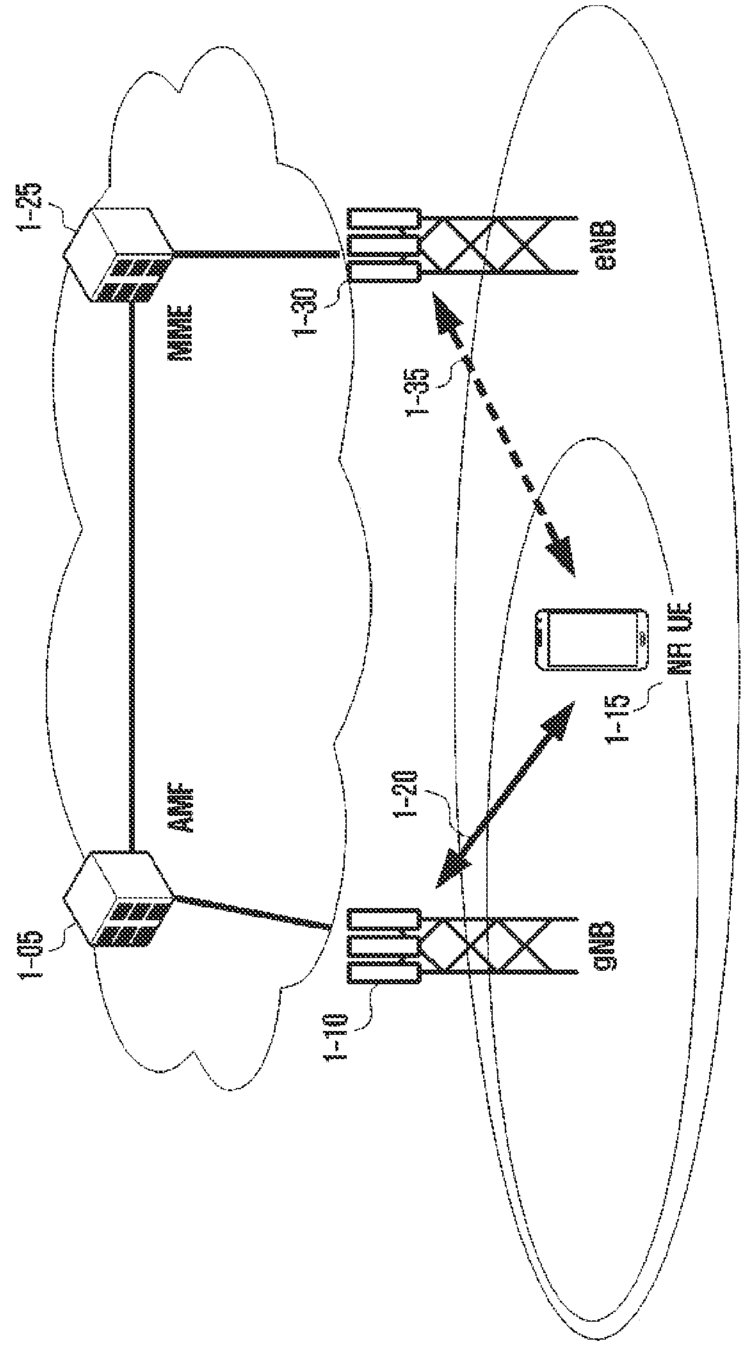
FIG. 1 is a diagram illustrating the structure of a next generation mobile communication system, according to an embodiment of the disclosure.

In describing embodiments in the disclosure, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements are exaggerated, omitted, or schematically illustrated in the accompanying drawings. In addition, the depicted size of each element does not fully reflect the actual size. In the drawings, the same or corresponding elements are assigned the same reference numerals.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the disclosure, the same reference numerals refer to the same elements. It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term 'unit' refers to a software element or a hardware element, such as a field programmable gate array (FPGA) or an application specific integrated circuit (ASIC), which performs a predetermined function. However, the term "unit" does not always have a meaning limited to software or hardware. A 'unit' may be constructed either to be stored in an addressable storage medium or to execute one or more processors. Therefore, a 'unit' includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and 'units' may be combined into those of a smaller number of elements and 'units' or separated into those of a larger number of elements and 'units'. In addition, the elements and 'units' may be implemented to operate one or more central processing units (CPUs) within a device or a secure multimedia card.

In the following description, a term for identifying an access node, a term referring to a network entities, a term referring to messages, a term referring to an interface between network entities, a term referring to various kinds of identification information, and the like are exemplified for convenience of description. Accordingly, the disclosure is not limited to the terms described below, and other terms having equivalent technical meanings may be used.

Hereinafter, for convenience of description, the disclosure will use terms and names defined in the 3rd Generation Partnership Project Long Term Evolution (3GPP LTE) standard or the New Radio (NR) standard. However, the disclosure is not limited by such terms and names, and can be equally applied to systems complying with other standards. In the disclosure, the eNB may be used interchangeably with the gNB for convenience of description. That is, the base station described as the eNB may indicate the gNB. In addition, the term terminal may refer to a mobile phone, an NB-IoT device, a sensor, or any other wireless communication device. Hereinafter, a base station, as a subject that performs resource allocation of a terminal, may be at least one of a gNode B (gNB), an eNode B (eNB), a Node B, a base station (BS), a radio access unit, a base station controller, or a node on a network. A terminal may include a user equipment (UE), a mobile station (MS), a cellular phone, a smart phone, a computer, or a multimedia system capable of performing a communication function.

The disclosure is applicable to 3GPP NR (5th generation mobile communication standard). In addition, based on 5G communication technology and Internet of Things (IoT) related technology, the disclosure can be applied to intelligent services (e.g., smart home, smart building, smart city, smart or connected car, healthcare, digital education, retail, security and safety related services, etc.)

Wireless communication systems are evolving from providing a traditional voice-oriented service into wideband wireless communication systems that provide high-speed and high-quality packet data services as in communication standards such as high speed packet access (HSPA), long term evolution (LTE) (or evolved universal terrestrial radio access (E-UTRA)), or LTE-A (advanced) of 3GPP, high rate packet data (HRPD), or ultra-mobile broadband (UMB) of 3GPP2, and 802.16e of IEEE. As a typical example of the wideband wireless communication systems, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) transmits data or control signals to a base station (BS) (or eNB, gNB), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

Since a 5G communication system, which is a communication system subsequent to LTE, must freely reflect various requirements of users, service providers, and the like, services satisfying various requirements must be supported. The services considered in the 5G communication system include enhanced Mobile Broadband (eMBB) communication, massive Machine Type Communication (mMTC), Ultra-Reliability Low-Latency Communication (URLLC), and the like.

Hereinafter, LTE, LTE-A, LTE Pro, 5G (or NR), or 6G systems will be described by way of example, but embodiments of the disclosure may also be applied to other communication systems having similar technical backgrounds or channel types. In addition, based on determinations by those skilled in the art, the embodiments of the disclosure may also be applied to other communication systems through some modifications without significantly departing from the scope of the disclosure. In the following description of the disclosure, if it is determined that a detailed description of a related known function or configuration may unnecessarily obscure the subject matter of the disclosure, the detailed description will be omitted. Hereinafter, embodiments of the disclosure will be described with reference to the attached drawings.

FIG. 1 is a diagram illustrating the structure of a next generation mobile communication system, according to an embodiment of the disclosure.

With reference to FIG. 1, a radio access network of the next generation mobile communication system (new radio, NR) may be composed of a next generation base station (new radio node B, gNB) 1-10 and a wireless core network (new radio core network). The wireless core network may include, but is not limited to, an access management function (AMF) 1-05. A user terminal (new radio user equipment, NR UE) 1-15 can access an external network through the gNB 1-10 and the AMF 1-05.

In FIG. 1, the gNB 1-10 may correspond to an evolved node B (eNB) of the existing long term evolution (LTE) system. The gNB 1-10 can be connected (1-20) to the NR UE 1-15 through a wireless channel and can provide superior services than the existing node B. In the next generation mobile communication system, all user traffic can be serviced through a shared channel, so a device that collects status information such as buffer status, available transmission power status, and channel status of UEs and performs scheduling may be needed. This may be performed by the gNB 1-10. Typically one gNB 1-10 can control a plurality of cells. The gNB can have more than the existing maximum bandwidth in order to implement ultra-high data transmission compared to the existing LTE, and further, beamforming technology can be performed using orthogonal frequency division multiplexing (OFDM) as a radio access technology.

In addition, according to an embodiment, an adaptive modulation and coding (AMC) scheme that determines a modulation scheme and a channel coding rate in accordance with the channel status of the UE can be applied. The AMF 1-05 can perform functions such as mobility support, bearer configuration, and quality of service (QOS) configuration. The AMF 1-15 is a device that handles various control functions as well as mobility management functions for the UE and can be connected to a plurality of base stations. Additionally, the next generation mobile communication system can be linked to the existing LTE system, and the AMF 1-05 can be connected to a mobility management entity (MME) 1-25 through a network interface. The MME 1-25 can be connected to an existing base station, eNB 1-30. The UE that supports LTE-NR dual connectivity can transmit and/or receive data while maintaining connectivity 1-35 to not only the gNB 1-10 but also the eNB 1-30.

Figure 2:
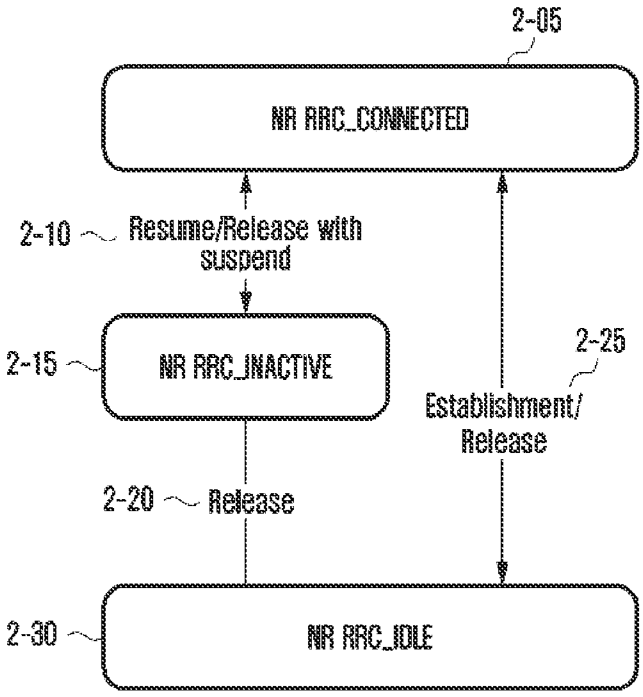
FIG. 2 is a diagram illustrating the RRC state transition in a next generation mobile communication system, according to an embodiment of the disclosure.

FIG. 2 is a diagram illustrating the RRC state transition in a next generation mobile communication system, according to an embodiment of the disclosure.

In the next generation mobile communication system, the UE may have three radio resource control (RRC) states. A connected mode (RRC_CONNECTED) 2-05 may indicate that the UE is in an RRC state capable of transmitting and receiving data. An idle mode (RRC_IDLE) 2-30 may indicate that the UE is in an RRC state capable of monitoring whether paging is transmitted to the UE. The connected mode 2-05 and the idle mode 2-30 are RRC states that can also be applied to the existing LTE system, and the detailed technology may be the same as that of the LTE system. In the next generation mobile communication system, an inactive mode (RRC_INACTIVE) 2-15 may be newly defined along with the connected mode 2-05 and the idle mode 2-30. The RRC INACTIVE newly defined in the next generation mobile communication system may correspond to an inactive RRC state, an INACTIVE mode, an inactive mode, etc.

In the inactive mode 2-15, UE context can be maintained in the base station and the UE, and radio access network (RAN) based paging can be supported. The features of the inactive mode 2-15 may be as follows.

- Cell re-selection mobility;
- CN-NR RAN connection (both C/U-planes) has been established for UE;
- The UE AS context is stored in at least one gNB and the UE;
- Paging is initiated by NR RAN;
- RAN-based notification area is managed by NR RAN;
- NR RAN knows the RAN-based notification area which the UE belongs to.

According to an embodiment, the inactive mode 2-15 can switch to the connected mode 2-05 or the idle mode 2-30 using specific procedures.

Referring to operation 2-10, the inactive mode 2-15 can switch to the connected mode 2-05 by a resume procedure, and the connected mode 2-05 can switch to the inactive mode 2-15 by a release procedure including suspend configuration information. In the above-mentioned operation 2-10, one or more RRC messages can be transmitted and received between the UE and the base station, and the operation 2-10 may consist of one or more steps.

Referring to operation 2-20, the inactive mode 2-15 can switch to the idle mode 2-30 through a procedure of release after resume.

Referring to operation 2-25, switching between the connected mode 2-05 and the idle mode 2-30 can be performed according to the typical LTE technology. For example, switching between the connected mode 2-05 and the idle mode 2-30 can be achieved through an establishment or release procedure.

Figure 3:
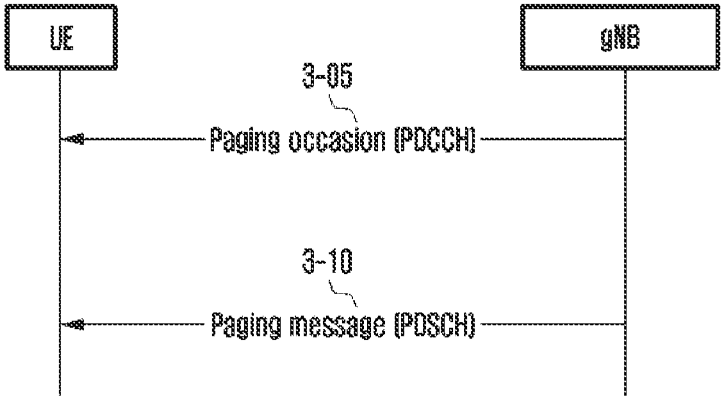
FIG. 3 is a diagram illustrating the operation of a base station (or network) that broadcasts a paging occasion and a paging message, according to an embodiment of the disclosure.

FIG. 3 is a diagram illustrating the operation of a base station (or network) that broadcasts a paging occasion and a paging message, according to an embodiment of the disclosure.

5G or next generation radio access network (NG-RAN) based on NR is composed of NG-RAN nodes, where the NG-RAN node may refer to a gNB. The gNB can provide NR user plane (UP) and control plane (CP) protocol termination to the UE. In addition, the gNBs are connected through an NG interface for 5G core (5GC), and more specifically connected to an access and mobility management function (AMF) via an NG-control (NG-C) interface and to a user plane function (UPF) via an NG-user (NG-U) interface. In the 5G (NR or new radio) wireless communication system, the UE can use discontinuous reception (DRX) to reduce power consumption in RRC_IDLE or RRC_INACTIVE mode. In RRC_IDLE or RRC_INACTIVE state, the UE does not always monitor a physical downlink control channel (PDCCH), and may monitor the PDCCH periodically (e.g., every DRX cycle) only for a short period of time in order to receive a paging occasion, receive a system information (SI) update notification, or receive an emergency notification. A paging message 3-10 may be transmitted via a physical downlink shared channel (PDSCH). If there is the paging message 3-10 in the PDSCH, the PDCCH may be indicated with a paging radio network temporary identifier (P-RNTI). The P-RNTI may be common for all UEs. UE Identity (e.g., a system architecture evolution (SAE) temporary mobile subscription identifier (S-TMSI) for UE in RRC_IDLE state or an inactive radio network temporary identifier (I-RNTI) for UE in RRC_INACTIVE state) may be included in the paging message 3-10 to indicate paging for a specific UE. The paging message 3-10 may include multiple UE identities for paging multiple UEs. The paging message 3-10 may be broadcast over a data channel (e.g., PDSCH) (e.g., the PDCCH is masked with P-RNTI). The system information (SI) update and the emergency notification are included in downlink control information (DCI), and the PDCCH carrying DCI may be indicated with P-RNTI. In RRC_IDLE or RRC_INACTIVE mode, the UE can monitor one paging occasion (PO) 3-05 per DRX cycle. In RRC_IDLE or RRC_INACTIVE mode, the UE can monitor the PO in the initial downlink bandwidth part (DL BWP). In the RRC connected state, the UE can monitor one or more POs to receive an SI update notification and receive an emergency notification. The UE can monitor all POs in the paging DRX cycle and can monitor at least one PO in an SI modification period. In RRC_IDLE or RRC_INACTIVE mode, the UE can monitor the PO in the active DL BWP. The PO is a set of S PDCCH monitoring occasions for paging, where 'S' may denote the number of SSBs (synchronization signal and PBCH (physical broadcast channel) blocks) transmitted in the cell. The UE may first determine a paging frame (PF) and then determine the PO for the determined PF. One PF may be a radio frame (10 ms). The PF and PO determination method is as follows.

- The PF for a UE is the radio frame with system frame number 'SFN' which satisfies the equation (SFN+PF_offset) mod T=(T div N)*(UE_ID mod N).

Index (i_s), indicating the index of the PO is determined by i_s=floor(UE_ID/N) mod Ns.

T is DRX cycle of the UE.

In RRC_INACTIVE state, T is determined by the shortest of the UE specific DRX value configured by RRC, UE specific DRX value configured by NAS, and a default DRX value broadcast in system information.

In RRC_IDLE state, T is determined by the shortest of UE specific DRX value configured by NAS, and a default DRX value broadcast in system information. If UE specific DRX is not configured by upper layers (i.e. NAS), the default value is applied.

N: number of total paging frames in T

Ns: number of paging occasions for a PF

PF_offset: offset used for PF determination

UE_ID: 5G-S-TMSI mod 1024

Parameters Ns, nAndPagingFrameOffset, and the length of default DRX Cycle are signaled in SIB1. The values of N and PF offset are derived from the parameter nAndPagingFrameOffset as defined in TS 38.331. If the UE has no 5G-S-TMSI, for instance when the UE has not yet registered onto the network, the UE shall use as default identity UE_ID=0 in the PF and i_s formulas above.

The PDCCH monitoring occasions for paging are determined based on paging search space configuration (paging-SearchSpace) signaled by gNB.

In the case where SearchSpaceId=0 is configured for pagingSearchSpace, the PDCCH monitoring occasion for paging is the same as for remaining system information (RMSI) (see what is defined in clause 13 in TS 38.213). In the case where SearchSpaceId=0 is configured for pagingSearchSpace, Ns is either 1 or 2. If Ns=1, there is only a single PO starting from the first PDCCH monitoring occasion for paging in the PF. If Ns=2, the PO exists in the first half frame (i_s=0) or the second half frame (i_s=1) of the PF.

In the case where a non-zero SearchSpaceId is configured for pagingSearchSpace, the UE monitors the (i_s+1)th PO. The PDCCH monitoring occasion for paging is determined based on the paging search space configuration (paging-SearchSpace) signaled by the gNB. In the case of PDCCH monitoring for paging that does not overlap with a UL symbol (determined a according to tdd-UL-DL-ConfigurationCommon), it is numbered sequentially from 0 from the first PDCCH monitoring occasion for paging in the PF. The gNB can signal the parameter firstPDCCH-MonitoringOccasionOfPO for each PO corresponding to the PF. In the case where firstPDCCH-MonitoringOccasionOfPO is signaled, the (i_s+1)th PO is a set of 'S' consecutive PDCCH monitoring occasions for paging, starting from the PDCCH monitoring number occasion indicated by firstPDCCH-MonitoringOccasionOfPO. That is, the (i_s+1)th value of the firstPDCCH-MonitoringOccasionOfPO parameter or the (i_s+1)th PO is a set of 'S' consecutive PDCCH monitoring occasions for paging, starting from the (i_s*S)th PDCCH monitoring occasion for paging. 'S' is the number of actually transmitted SSBs determined according to the parameter ssb-PositionsInBurst signaled in SystemInformationBlock1 received from the gNB. The parameter first-PDCCH-MonitoringOccasionOfPO is signaled in SIB1 for paging in the initial DL BWP. In the case of paging in the DL BWP other than the initial DL BWP, the parameter first-PDCCH-MonitoringOccasionOfPO is signaled in the corresponding BWP configuration. For detailed description of the above, please refer to TS 38.304.

The PDCCH indicated with P-RNTI may deliver information according to DCI format 1_0. The following information can represent information delivered in DCI format 1_0 using a cyclic redundancy check (CRC) scrambled with P-RNTI.

Short Messages Indicator—2 bits according to Table 1.

Short Messages—8 bits according to Table 2. If only the scheduling information for Paging is carried, this bit field is reserved.

Frequency domain resource assignment -

$$\lceil \log_2(N_{RB}^{DL,BWP}(N_{RB}^{DL,BWP}+1)/2\rceil$$

bits. If only the short message is carried, this bit field is reserved.

$$N_{RB}^{DL,BWP}$$

is the size of CORESET 0

Time domain resource assignment—4 bits as defined in Subclause 5.1.2.1 of [6, TS38.214]. If only the short message is carried, this bit field is reserved.

VRB-to-PRB mapping—1 bit according to Table 7.3.1.1.2-33 of [5, TS 38.212]. If only the short message is carried, this bit field is reserved.

Modulation and coding scheme—5 bits as defined in Subclause 5.1.3 of [6, TS38.214], using Table 5.1.3.1-1. If only the short message is carried, this bit field is reserved.

TB scaling—2 bits as defined in Subclause 5.1.3.2 of [6, TS38.214]. If only the short message is carried, this bit field is reserved.

Reserved bits—6 bits

Table 1 below shows the Short Message indicator.

TABLE 1

| Bit field | Short Message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

TABLE 2

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3-8 | Reserved |

Table 3

The UE can detect PDCCH transmission from the gNB to monitor the PO (3-05), know the Short Message indicator through this, and determine through this whether there is a paging message. If it is determined that there is a paging message through the Short Message indicator, the UE can receive the PDSCH (e.g., paging message) (3-10).

TABLE 3

```
Paging ::=                      SEQUENCE {
  pagingRecordList                    PagingRecordList
OPTIONAL, -- NeedN
  lateNonCriticalExtension           OCTETSTRING
OPTIONAL,
  nonCriticalExtension                SEQUENCE{ }
OPTIONAL
}
PagingRecordList ::=              SEQUENCE (SIZE(1.maxNrofPageRec)) OF
PagingRecord
PagingRecord ::=                SEQUENCE {
  ue-Identity                      PagingUE-Identity,
  accessType                            ENUMERATED {non3GPP}
OPTIONAL, -- NeedN
  ...
}
PagingUE-Identity ::=          CHOICE {
  ng-5G-S-TMSI                        NG-5G-S-TMSI,
  fullI-RNTI                         I-RNTI-Value,
  ...
}
```

A paging message format is as shown in Table 3. One paging message includes a list with PagingRecord as an entry, and each entry may include ue-Identity to indicate which UE has paging. If the UE finds a PagingRecord identical to its UE identity (e.g., S-TMSI or I-RNTI) in the list, it can start transitioning to RRC connected mode.

It can be classified into two types depending on which entity initiates paging. In the case of 'CN-initiated paging' or 'CN paging', it indicates that the core network (CN), the access and mobility management function (AMF), or the mobility management entity (MME) initiates paging, and in the case of 'RAN-initiated paging' or 'RAN paging', it indicates that the RAN (base station, gNB, or eNB) initiates paging.

The UE in idle mode monitors the paging channel to receive CN paging. The UE in inactive mode monitors the paging channel to receive RAN paging as well as CN paging. Meanwhile, the UEs do not need to continuously monitor the paging channel. The UEs may be required to monitor the paging channel only during the paging occasion (PO) once per DRX cycle defined in TS 38.304. The paging DRX cycle may be configured by the network:

1) For CN paging, the default cycle (or default CN paging cycle) may be broadcast through system information.
2) For CN paging, a UE specific cycle (or UE specific CN paging cycle) may be configured through NAS signaling.
3) For RAN paging, a UE specific cycle (or UE specific RAN paging cycle or RAN paging cycle) may be configured through RRC signaling.

The UE may use the smallest value among applicable (i.e., configured) DRX cycles depending on the RRC mode as the paging monitoring cycle. That is, the idle mode UE may use a smaller value between the default CN paging cycle and the UE specific CN paging cycle (if configured). The inactive mode UE may use the smallest value among the default CN paging cycle, the UE specific CN paging cycle (if configured), and the RAN paging cycle (if configured).

Figure 4:
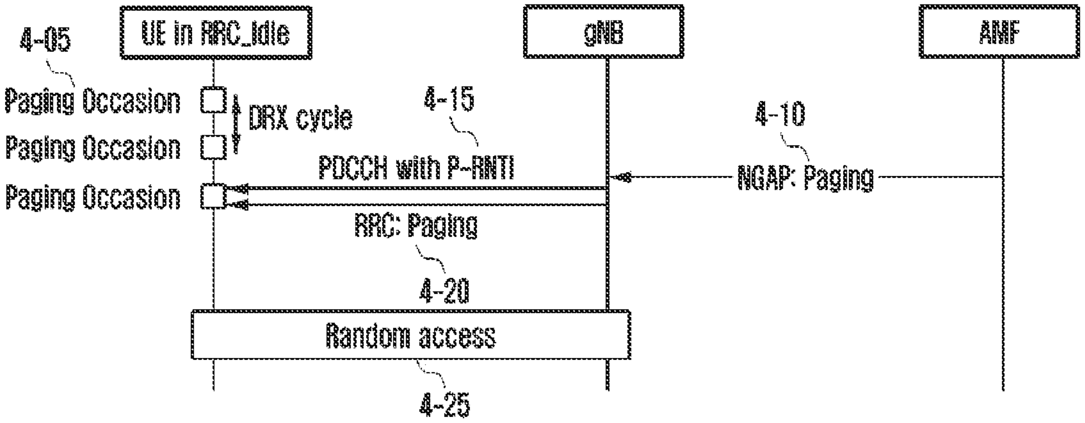
FIG. 4 is a diagram illustrating a core network (CN) paging reception procedure of an idle mode UE, according to an embodiment of the disclosure.

FIG. 4 is a diagram illustrating a CN paging reception procedure of an idle mode UE (UE in RRC_Idle), according to an embodiment of the disclosure.

The idle mode UE can monitor the paging channel during the paging occasion (PO) 4-05 for each predefined DRX cycle to save energy. In other words, the UE can enter sleep mode between the POs. In each PO, the UE can scan the PDCCH having a CRC scrambled with P-RNTI. If the user plane function (UPF) receives downlink data toward the UE, the UPF can initiate a paging procedure to an AMF through a session management function (SMF). In step 4-10, the AMF may be managing the location information of the UE in units of registered tracking areas, and may broadcast an NG application protocol (NGAP) paging message to all gNBs within the registered tracking areas to which the UE belongs. The gNBs that have received the NGAP paging message transmit the PDCCH (having a CRC scrambled with P-RNTI) according to the UE's PO (step 4-15, and see step 3-05 in FIG. 3). The UE that is scanning the PDCCH can detect PDCCH transmission from the gNB and receive an RRC paging message (step 4-20, and see 3-10 in FIG. 3). If the UE finds a PagingRecord identical to its UE identity (e.g., S-TMSI or I-RNTI) in the RRC paging message, it may perform a random access to establish an RRC connection (see step 4-25).

Figure 5:
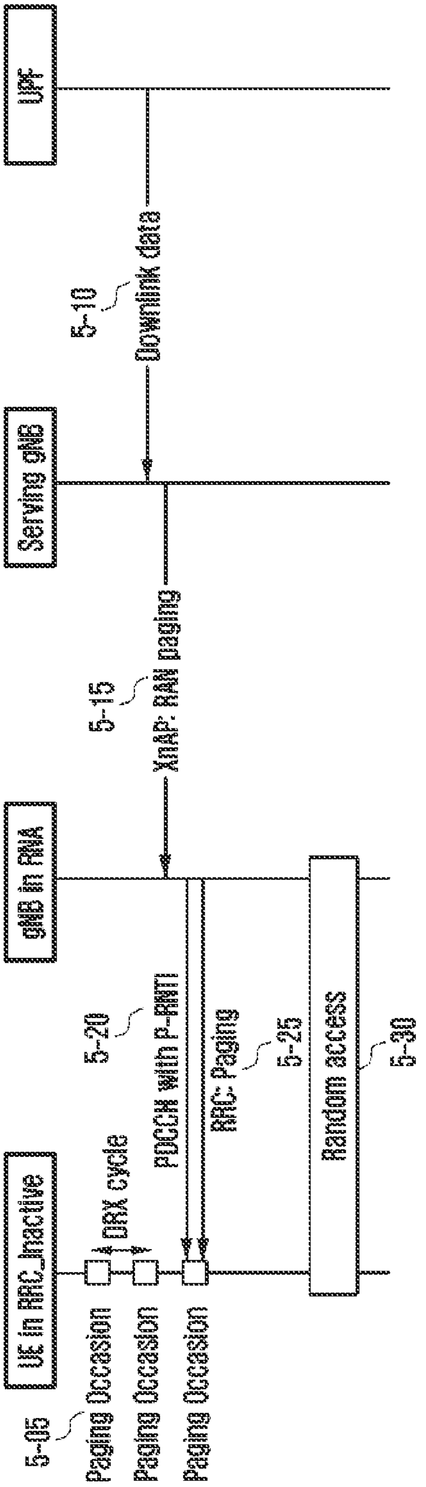
FIG. 5 is a diagram illustrating a RAN paging reception procedure of an inactive mode UE, according to an embodiment of the disclosure.

FIG. 5 is a diagram illustrating a RAN paging reception procedure of an inactive mode UE (UE in RC-Inactive), according to an embodiment of the disclosure. The inactive mode UE can monitor the paging channel during the paging occasion (PO) 5-05 for each predefined DRX cycle to save energy. In other words, the UE can enter sleep mode between POs. In each PO, the UE can scan the PDCCH having a CRC scrambled with P-RNTI. If the UPF receives downlink data toward the UE, it may deliver the received data to a serving base station (serving gNB) (see step 5-10). The serving base station may be storing or managing the location records of the UE in units of RAN notification area (RNA). Therefore, the serving base station can deliver an Xn application protocol (XnAP) RAN paging message to all gNBs in the RNA to which the UE belongs (see step 5-15). The gNBs that have received the XnAP RAN paging message transmits the PDCCH (having a CRC scrambled with P-RNTI) according to the UE's PO (step 5-20, and see step 3-05 in FIG. 3). The UE that is scanning the PDCCH can detect PDCCH transmission from the gNB and receive an RRC paging message (step 5-25, and see 3-10 in FIG. 3). If the UE finds a PagingRecord identical to its UE identity (e.g., S-TMSI or I-RNTI) in the RRC paging message, it may perform a random access to resume the RRC connection (see step 5-30).

Figure 6:
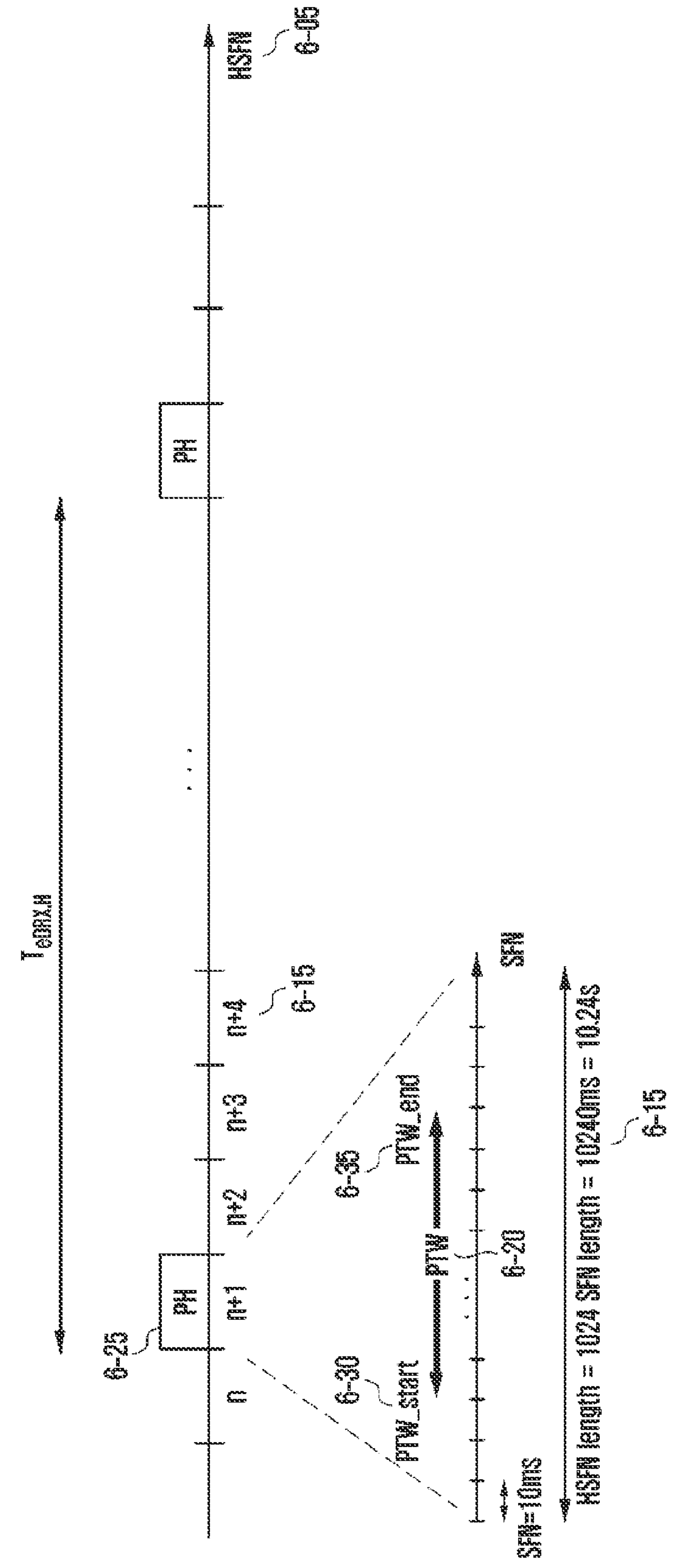
FIG. 6 is a diagram illustrating a paging procedure using extended DRX (eDRX) in LTE, according to an embodiment of the disclosure.

FIG. 6 is a diagram illustrating a paging procedure using eDRX in LTE, according to an embodiment of the disclosure.

If extended DRX (eDRX) is configured for an idle mode UE in LTE, the following may be applied.

In idle mode, the DRX cycle can extend to 10.24 s or more, and up to 2621.44 s (43.69 minutes).

A hyper slot frame number (Hyper-SFN or H-SFN or HSFN) 6-05 is broadcast in the cell, and the HSFN may increase by 1 for each cycle of the SFN value. With reference to 6-10 in FIG. 6, if the first HSFN is n, the next HSFN is n+1, the further next HSFN is n+2, and so on. In LTE, as time passes, the SFN value increases by 1 from 0 to 1023 (10 ms per radio frame). After SFN reaches 1023, it returns to 0, and in this case, the HSFN value may increase by 1. As a result, with reference to 6-15, the length of one HSFN is equal to the length of 1024 SFNs, and it can also be equal to 10240 ms (=10.24 s).

A paging hyperframe (PH) may refer to an H-SFN in which the UE starts paging DRX monitoring during a paging time window (PTW) used in ECM-IDLE mode. The PH may be determined by a formula known to the MME/AMF, UE, and base station, and determined as a function of the eDRX cycle and the UE identity.

The UE may monitor paging 1) during the PTW or 2) until it receives a paging message containing the UE's NAS identity (or until whichever of both occurs first). The starting offset of the PTW is uniformly distributed within the PH and can be defined according to TS 36.304.

The MME/AMF may determine the PH and the PTW start time using the formulas defined in TS 36.304. In addition, the MME/AMF may send an S1 paging request just before the start of the PTW or during the PTW to avoid a procedure of storing the paging message at the base station.

When the UE uses eDRX, the requirements of earthquake and tsunami warning system (ETWS), commercial mobile alert service (CMAS), and public warning system (PWS) may not be satisfied. For extended access barring (EAB), if the UE using eDRX supports SIB14, SIB14 can be acquired before establishing the RRC connection.

When the eDRX cycle is longer than a system information modification period, the UE may check whether system information stored before establishing the RRC connection is valid. For the UE configured with the eDRX cycle longer than the system information modification period, a paging message containing systemInfoModification-eDRX may be used to notify a change in system information.

In LTE, the UE may receive eDRX configuration including the eDRX cycle (TeDRX) from the NAS. The UE may operate with eDRX only in the case where the UE is configured with eDRX by the NAS and the serving cell indicates that it supports eDRX through system information. If $T_{eDRX}$ is configured with 512 radio frames in the UE, the PO may be monitored with T=512 according to legacy DRX operation (clause 7.1 in TS 36.304). In other cases, the UE configured with eDRX may monitor the PO 1) according to legacy DRX operation (clause 7.1 in TS 36.304) during the periodic PTW, or 2) until it receives a paging message containing the NAS identity of the UE (until whichever of both arrives first). The PTW 6-20 is UE-specific and determined by 1) the paging hyperframe (PH) 6-25, 2) the PTW start point (PTW_start) 6-30 within the PH 6-25, and 3) the PTW end point (PTW_end) 6-35. These three PTW determinants are determined by equations below. In one embodiment, depending on the PTW_start 6-30 and the configured length of the PTW 6-20, the PTW_end 6-35 may indicate an SFN outside the PH 6-25 that includes the PTW_start 6-30.

TABLE 4

| |
|---|
| The PH is the H-SFN satisfying the following equation: |
| H-SFN mod TeDRX,H= (UE_ID_H mod TeDRX,H), where |
| - UE_ID_H: |
| - 10 most significant bits of the Hashed ID, if P-RNTI is monitored on PDCCH or MPDCCH |
| - 12 most significant bits of the Hashed ID, if P-RNTI is monitored on NPDCCH |
| - $T_{eDRX,H}$ : eDRX cycle of the UE in Hyper-frames, ($T_{eDRX,H}$=1, 2, ... , 256 Hyper-frames) (for NB-IoT, $T_{eDRX,H}$ =2, ..., 1024 Hyper-frames) and configured by upper layers. |
| PTW_start denotes the first radio frame of the PH that is part of the PTW and has SFN satisfying the following equation: |
| SFN = 256* $i_{eDRX}$, where |
| - $i_{eDRX}$ = floor(UE_ID_H/$T_{eDRX,H}$) mod 4 |
| PTW_end is the last radio frame of the PTW and has SFN satisfying the following equation: |
| SFN = (PTW_start + L*100 − 1) mod 1024, where |
| - L = Paging Time Window length (in seconds) configured by upper layers |
| Hashed ID is defined as follows: |
| Hashed_ID is Frame Check Sequence (FCS) for the bits b31, b30, ..., b0 of S-TMSI or 5G-S-TMSI. 5G-S-TMSI is used for Hashed-ID if the UE supports connection to 5GC and NAS indicated to use 5GC for the selected cell. |
| S-TMSI = <b39, b38, ..., b0> as defined in TS 23.003 [35] |
| 5G-S-TMSI = <b47, b46, ..., b0> as defined in TS 23.003 [35]. |
| The 32-bit FCS shall be the ones complement of the sum (modulo 2) of Y1 and Y2, where |
| - Y1 is the remainder of $x^k$ ($x^{31} + x^{30} + x^{29} + x^{28} + x^{27} + x^{26} + x^{25} + x^{24} + x^{23} + x^{22} + x^{21} + x^{20} + x^{19} + x^{18} + x^{17} + x^{16} + x^{15} + x^{14} + x^{13} + x^{12} + x^{11} + x^{10} + x^9 + x^8 + x^7 + x^6 + x^5 + x^4 + x^3 + x^2 + x^1 + 1$) divided (modulo 2) by the generator polynomial $x^{32} + x^{26} + x^{23} + x^{22} + x^{16} + x^{12} + x^{11} + x^{10} + x^8 + x^7 + x^5 + x^4 + x^2 + x + 1$, where k is 32; and |
| - Y2 is the remainder of Y3 divided (modulo 2) by the generator polynomial $x^{32} + x^{26} + x^{23} + x^{22} + x^{16} + x^{12} + x^{11} + x^{10} + x^8 + x^7 + x^5 + x^4 + x^2 + x + 1$, where Y3 is the product of $x^{32}$ by "b31, b30, ..., b0 of S-TMSI or 5G-S-TMSI", i.e., Y3 is the generator polynomial $x^{32}$ (b31*$x^{31}$ + b30*$x^{30}$ + ... + b0*1). |
| NOTE: The Y1 is 0xC704DD7B for any S-TMSI or 5G-S-TMSI value. |

In LTE, the UE configured with eDRX may monitor the PO in a cycle described below, depending on its RRC state and whether inside or outside the PTW. (rf=radio frame, UE specific cycle=UE specific CN paging cycle, Default cycle=Default CN paging cycle)

1. RRC_IDLE UE may determine the paging monitoring cycle ($T_{DRX\_IDLE,LTE}$) as follows, depending on three cases (Case $1_{IDLE,LTE}$, $2_{IDLE,LTE}$, $3_{IDLE,LTE}$).

*Note: min refers to a function that outputs the minimum value of only values configured for the UE among input values.

Case $1_{IDLE,LTE}$) Case where $T_{eDRX}$ is not configured $T_{DRX\_IDLE,LTE}$=min (UE specific paging cycle, Default paging cycle)

Case $2_{IDLE,LTE}$) Case where $T_{eDRX}$ is configured with 512 rf (=5.12 seconds)

$T_{DRX\_IDLE,LTE}=T_{eDRX}$=5.12 seconds

Case $3_{IDLE,LTE}$) Case where $T_{eDRX}$ is not configured with 512 rf (=5.12 seconds)

Inside the PTW, $T_{DRX\_IDLE,LTE}$=min (UE specific paging cycle, Default paging cycle)

Outside the PTW, the UE may not monitor paging.

2. RRC_INACTIVE UE may determine the paging monitoring cycle ($T_{DRX\_INACTIVE,LTE}$) as follows, depending on three cases (Case $1_{INACTIVE,LTE}$, $2_{INACTIVE,LTE}$, $3_{INACTIVE,LTE}$).

Case $1_{INACTIVE,LTE}$) Case where $T_{eDRX}$ is not configured $T_{DRX\_INACTIVE,LTE}$=min (UE specific paging cycle, Default paging cycle, RAN paging cycle)

Case $2_{INACTIVE,LTE}$) Case where $T_{eDRX}$ is configured with 512 rf (=5.12 seconds)

$T_{DRX\_INACTIVE,LTE}$=min($T_{eDRX}$(=5.12 seconds), RAN paging cycle)

Case $3_{INACTIVE,LTE}$) Case where $T_{eDRX}$ is not configured with 512 rf (=5.12 seconds)

Inside the PTW, $T_{DRX\_INACTIVE,LTE}$=min (UE specific paging cycle, Default paging cycle, RAN paging cycle)

Outside the PTW, $T_{DRX\_INACTIVE,LTE}$=RAN paging cycle

Determination of the paging monitoring cycle (or DRX cycle) in LTE can be summarized as Table 5 and Table 6 below.

TABLE 5

| UE in RRC_IDLE mode | | |
|---|---|---|
| $T_{eDRX}$ is not configured | $T_{eDRX}$ = 5.12 s | $T_{eDRX}$ ≠ 5.12 s |
| min (UE specific, default) | $T_{eDRX}$ = 5.12 s | During PTW, min (UE specific, default)<br>Outside PTW, No monitoring |

TABLE 6

| UE in RRC_INACTIVE mode | | |
|---|---|---|
| $T_{eDRX}$ is not configured | $T_{eDRX}$ = 5.12 s | $T_{eDRX}$ ≠ 5.12 s |
| min (UE specific, default, RAN) | min ($T_{eDRX}$(=5.12 s), RAN) | During PTW, min (UE specific, default, RAN) |

The update of system information may occur in a specific radio frame, using the concept of modification period (or MP). The system information may be transmitted multiple times with the same information within the modification period according to network scheduling. The definition of the MP may be as follows. The modification period boundaries are defined by SFN values for which SFN mod m=0, where m is the number of radio frames comprising the modification period. The modification period is configured by system information. If H-SFN is provided in SystemInformationBlockType1-BR, modification period boundaries for BL UEs and UEs in CE are defined by SFN values for which (H-SFN*1024+SFN) mod m=0. For NB-IoT, H-SFN is always provided and the modification period boundaries are defined by SFN values for which (H-SFN*1024+SFN) mod m=0. In order to update the system information to the RRC_IDLE UE (or RRC_INACTIVE UE) configured to use a DRX cycle longer than the modification period, an extended discontinuous reception acquisition period (eDRX acquisition period or eAP) may be defined. The definition of the eAP may be as follows.

The boundaries of the eDRX acquisition period are determined by H-SFN values for which H-SFN mod 256=0. For NB-IoT, the boundaries of the eDRX acquisition period are determined by H-SFN values for which H-SFN mod 1024=0.

Figure 7:
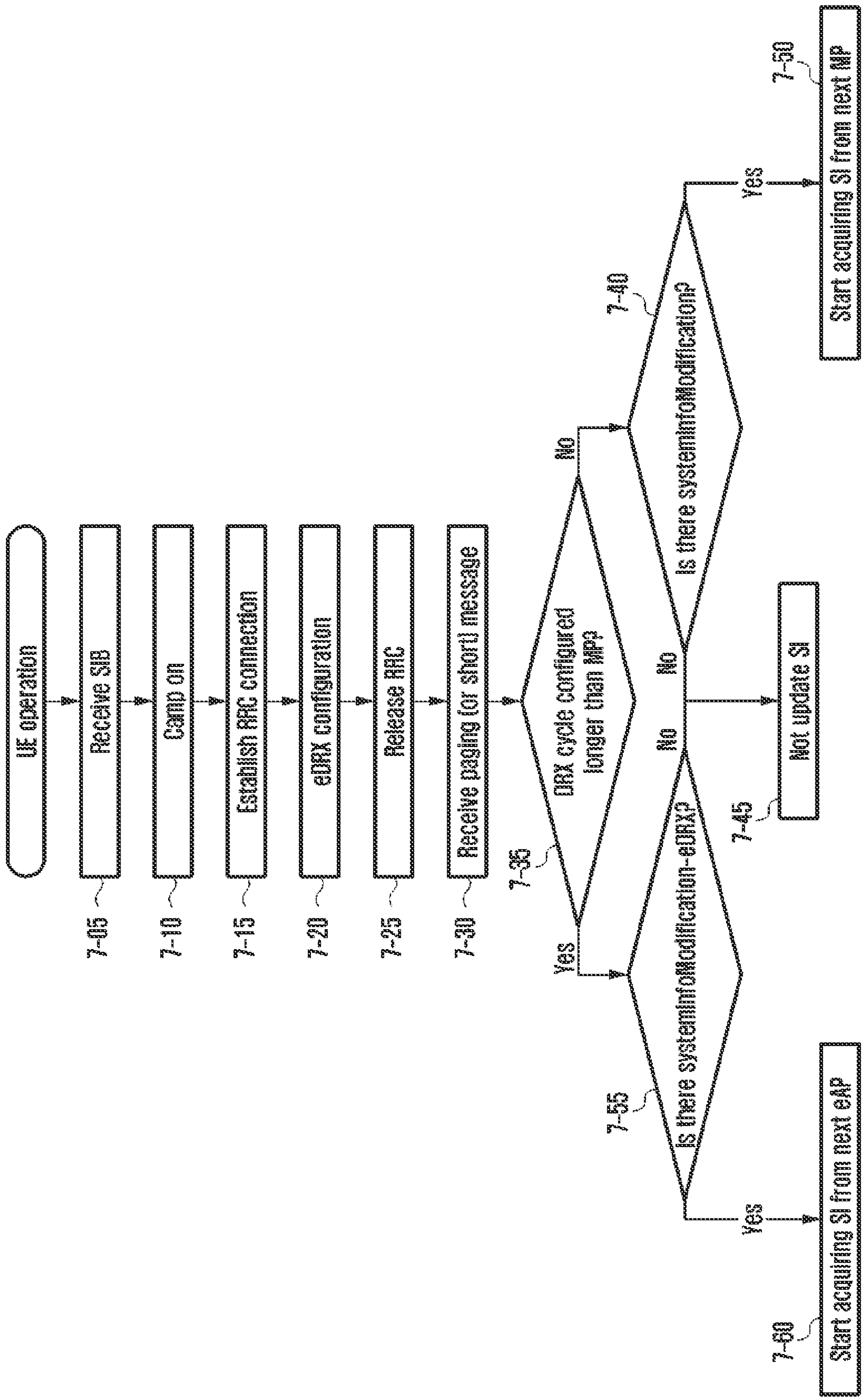
FIG. 7 is a diagram illustrating a process for determining the time when a UE updates system information in LTE, according to an embodiment of the disclosure.

FIG. 7 is a diagram illustrating a process for determining the time when a UE updates system information in LTE, according to an embodiment of the disclosure. In step 7-05, the UE may receive system information (system information block, SIB). In step 7-10, the UE may select one cell based on the received (single or plural) system information and camp on to the selected cell. Then, in step 7-15, the UE may establish an RRC connection with the cell. In step 7-20, the UE that transitions to the RRC connected mode may receive eDRX configuration from the CN through negotiation using NAS signaling (e.g., Attach request/accept, Tracking area update request/accept message) with the CN (the MME or the AMF). At this time, the eDRX configuration may include an eDRX cycle ($T_{eDRX}$). In step 7-25, the RRC connection of the UE is released, and the UE may transition an RRC mode to the idle mode (RRC_IDLE) or the inactive mode (RRC_INACTIVE). In step 7-30, the UE may receive a paging message (short message in NR). In step 7-35, the UE may determine whether the DRX cycle is configured to be longer than the modification period (MP). If the DRX cycle longer than the modification period is not configured for the UE, the UE may determine in step 7-40 whether the systemInfoModification indicator is configured in the received paging message (short message in NR). If the systemInfoModification indicator is not configured, the UE may not update the system information in step 7-45. If the systeminfoModification indicator is configured, the UE may start updating the necessary system information from the next MP in step 7-50.

If it is determined in step 7-35 that the DRX cycle longer than the modification period is configured for the UE, the UE may determine in step 7-55 whether the systemInfoModification-eDRX indicator is configured in the received paging message (short message in NR). If the systemInfoModification-eDRX indicator is not configured, the UE may not update the system information in step 7-45. If the systemInfoModification-eDRX indicator is configued, the UE may start updating the necessary system information from the next eAP in step 7-60.

Figure 8:
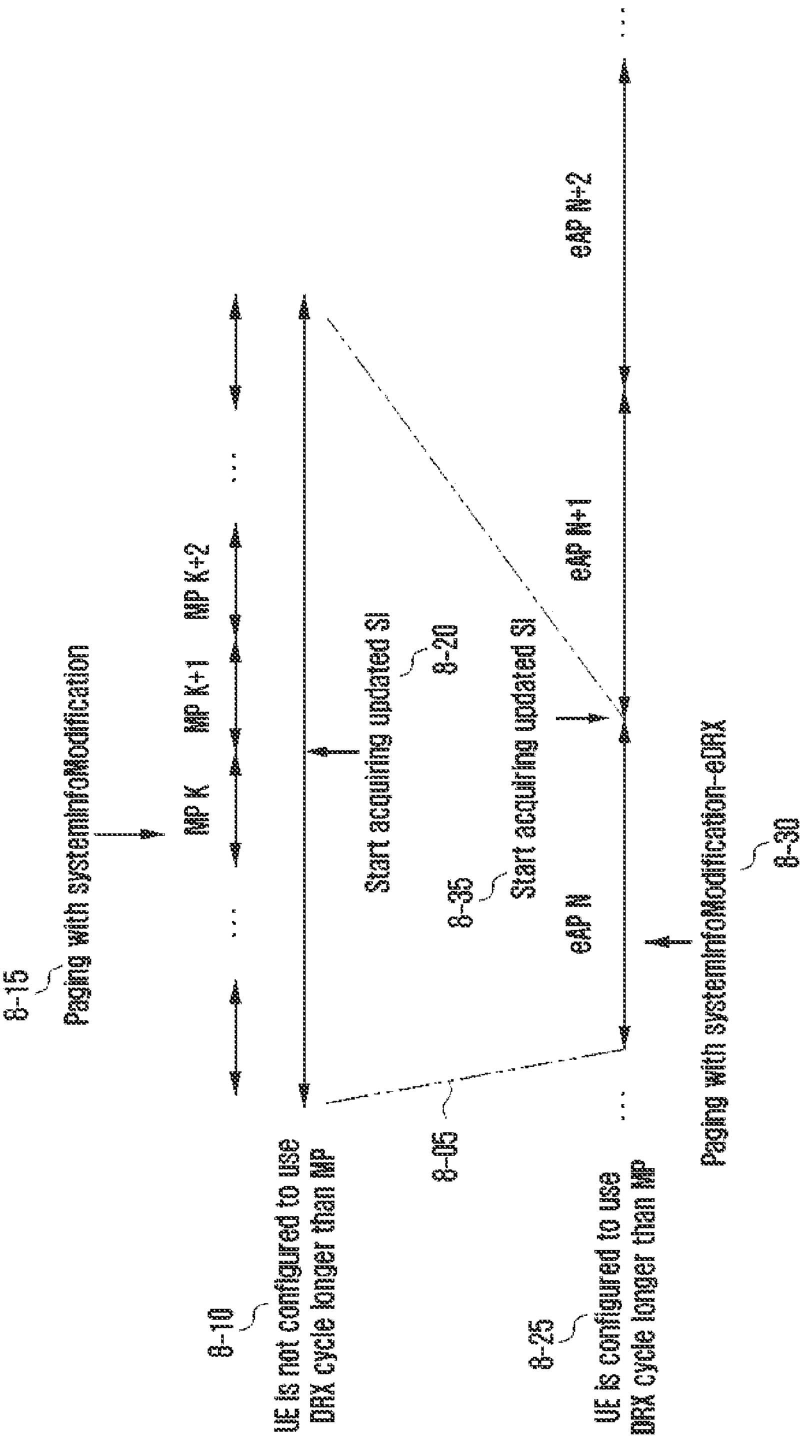
FIG. 8 is a diagram illustrating the time when a UE updates system information in LTE, according to an embodiment of the disclosure.

FIG. 8 is a diagram illustrating the time when a UE updates system information in LTE, according to an embodiment of the disclosure.

The length of one eAP may correspond to the length of a plurality of MPs (8-05). If the above step 7-35 is not satisfied, it can be expressed as follows.

In step 8-10, it indicates that the UE is not configured with a DRX cycle longer than the modification period.

In step 8-15, it indicates that the UE receives a paging message (short message in NR) with the systemInfoModification indicator configured. This corresponds to the case where the above step 7-40 is satisfied.

In step 8-20, the UE can start receiving the system information (SI) from the next MP (i.e., the K+1th MP) of the Kth MP that has received the paging message. This corresponds to the above step 7-50.

If the above 7-35 is satisfied, it can be expressed as follows.

In step 8-25, it indicates that the UE is configured with a DRX cycle longer than the modification period.

In step 8-30, it indicates that the UE receives a paging message (short message in NR) with the systemInfoModification-eDRX indicator configured. This corresponds to the case where the above step 7-55 is satisfied.

In step 8-35, the UE may start receiving the system information (SI) from the next eAP (i.e., the N+1th eAP) of the Nth eAP that has received the paging message. This corresponds to the above step 7-60.

Before eDRX was introduced in conventional LTE, the length of DRX used by the UE could always be configured to be no longer than MP (corresponding to step 8-10). That is, all UEs served by the base station were able to wake up to receive a paging message at least once within the MP. Therefore, in order to update the system information, the base station could update the system information of all UEs at once by simply instructing systemInfoModification every time the paging message is sent within one MP.

However, eDRX was introduced in LTE, and the length of DRX used by the UE configured with the eDRX can be configured to be longer than MP (corresponds to step 8-25). Such UEs may not receive a paging message even once within the MP. Therefore, in order to update the system information of such UEs, an eAP with a length greater than all eDRX cycles in LTE was defined, and the systemInfoModification-eDRX indicator was defined. In other words, the base station indicates the systemInfoModification-eDRX every time it sends the paging message within one eAP, so that the UEs having a DRX cycle longer than the MP can also be instructed to update the system information within the eAP at least once, and thereby perform the system information update.

Figure 9:
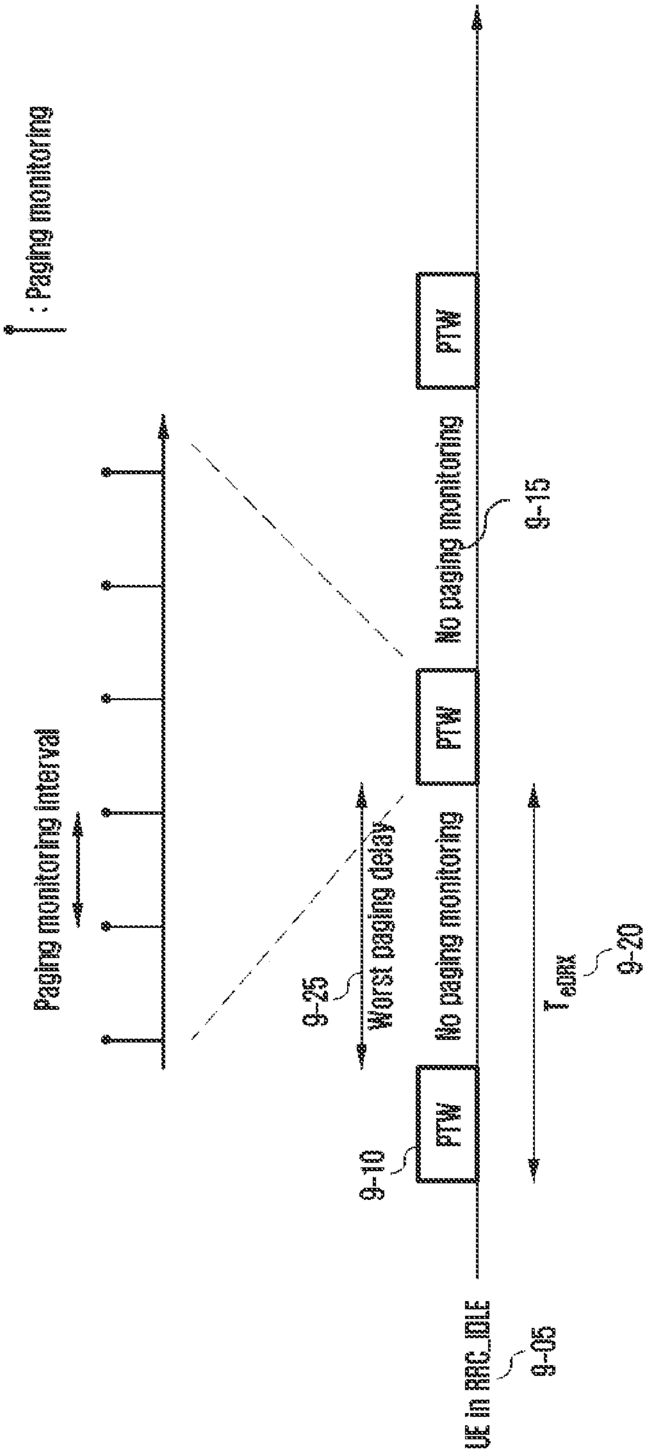
FIG. 9 is a diagram illustrating an example in which a UE in RRC_IDLE mode with eDRX configured monitors paging in LTE.

FIG. 9 is a diagram illustrating an example in which a UE in RRC_IDLE mode with eDRX configured monitors paging in LTE.

First, in LTE, as shown in Table 5, when eDRX is configured, the DRX cycle configured in step 7-35 can be interpreted as the configured eDRX cycle. The RRC_IDLE UE 9-05 with eDRX configured may not monitor paging outside of a PTW 9-10 (9-15). Considering that the PTW occurs every configured eDRX cycle ($T_{eDRX}$) 9-20, the maximum period during which the RRC_IDLE UE does not monitor paging may be $T_{eDRX}$. To be precise, the maximum period during which paging is not monitored is "$T_{eDRX}$–PTW length" 9-25, but considering that the PTW length can be sufficiently small compared to $T_{eDRX}$, it can be briefly considered as $T_{eDRX}$.

If the maximum period (=configured eDRX cycle=$T_{eDRX}$) during which the UE does not monitor paging is not longer than the MP, the UE can receive paging at least once within the MP, so it can update the system information from the next MP. If the period (=configured eDRX cycle=$T_{eDRX}$) during which the UE does not monitor paging is longer than the MP, the UE may not have a chance to receive paging within the MP, so it can update the system information from the next eAP. The RAN2 Working group agreed at the RAN2 #113bis-e meeting to divide the conventional $T_{eDRX}$ in NR into an eDRX cycle (=$T_{eDRX\_IDLE}$) for RRC_IDLE UEs and an eDRX cycle (=$T_{eDRX\_INACTIVE}$) for RRC_INACTIVE UEs, unlike the eDRX configuration in LTE.

RAN2 #113bis-e Agreement:

At least for eDRX cycle, the configurations of the eDRX for RRC_IDLE and RRC_INACTIVE can be different (FFS for PTW, e.g. length and starting point, when eDRX cycles are longer than 10.24 s)

Since $T_{eDRX\_IDLE}$ can be configured by the CN, it can also be expressed as $T_{eDRX\_CN}$.

Since $T_{eDRX\_INACTIVE}$ can be configured by the RAN (base station), it can also be expressed as $T_{eDRX\_RAN}$. Additionally, the RAN2 WG agreed to determine the cycle (DRX cycle), at which the RRC_IDLE UE and the RRC_INACTIVE UE monitor paging according to the configurations of $T_{eDRX\_IDLE}$ and $T_{eDRX\_INACTIVE}$, as follows.

1. The RRC_IDLE UE may determine the paging monitoring cycle ($T_{DRX\_IDLE,NR}$) as follows, depending on three cases (Case $1_{IDLE,NR}$, $2_{IDLE,NR}$, $3_{IDLE,NR}$).

*Note: min refers to a function that outputs the minimum value of only values configured for the UE among input values.

Case $1_{IDLE,NR}$) Case where $T_{eDRX\_IDLE}$ is not configured $T_{DRX\_IDLE,NR}$=min(UE specific paging cycle, Default paging cycle)

Case $2_{IDLE,NR}$) Case where $T_{eDRX\_IDLE}$ is configured to be longer than or equal to 10.24 seconds or less $T_{DRX\_IDLE,NR}=T_{eDRX\_IDLE}$ Case $3_{IDLE,NR}$) Case where $T_{eDRX\_IDLE}$ is configured with greater than 10.24 seconds Inside the PTW, $T_{DRX\_IDLE,NR}$=min(UE specific paging cycle, Default paging cycle)

Outside the PTW, the UE may not monitor paging.

*Note: In NR, the PTW is defined only in the case where $T_{eDRX\_IDLE}$>10.24 seconds, and it occurs every $T_{eDRX\_IDLE}$. The PTW according to $T_{eDRX\_INACTIVE}$ is not defined.

2. The RRC_INACTIVE UE may determine the paging monitoring cycle ($T_{DRX\_INACTIVE,NR}$) as follows, depending on five cases (Case $1_{INACTIVE,NR}$, $2_{INACTIVE,NR}$, $3_{INACTIVE,NR}$, $4_{INACTIVE,NR}$, $5_{INACTIVE,NR}$).

Case $1_{INACTIVE,NR}$) Case where $T_{eDRX\_IDLE}$ is not configured and $T_{eDRX\_INACTIVE}$ is also not configured.

$T_{DRX\_INACTIVE,NR}$=min(UE specific paging cycle, Default paging cycle, RAN paging cycle)

Case $2_{INACTIVE,NR}$) Case where $T_{eDRX\_IDLE}$ is configured with 10.24 seconds or less and $T_{eDRX\_INACTIVE}$ is not configured.

$T_{DRX\_INACTIVE,NR}$=min($T_{eDRX\_IDLE}$, RAN paging cycle)

Case $3_{INACTIVE,NR}$) Case where $T_{eDRX\_IDLE}$ is configured with 10.24 seconds or less and $T_{eDRX\_INACTIVE}$ is configured with 10.24 seconds or less $T_{DRX\_INACTIVE,NR}$=min($T_{eDRX\_IDLE}$, $T_{eDRX\_INACTIVE}$)

Case $4_{INACTIVE,NR}$) Case where $T_{eDRX\_IDLE}$ is configured with greater than 10.24 seconds and $T_{eDRX\_INACTIVE}$ is not configured.

Inside the PTW, $T_{DRX\_INACTIVE,NR}$=min(UE specific paging cycle, Default paging cycle, RAN paging cycle)

Outside the PTW, $T_{DRX\_INACTIVE,NR}$=RAN paging cycle

Case $5_{INACTIVE,NR}$) Case where $T_{eDRX\_IDLE}$ is configured with greater than 10.24 seconds, and $T_{eDRX\_INACTIVE}$ is configured with 10.24 seconds or less Inside the PTW, $T_{DRX\_INACTIVE,NR}$=min(UE specific paging cycle, Default paging cycle, $T_{eDRX\_INACTIVE}$)

Outside the PTW, $T_{DRX\_INACTIVE,NR}$=$T_{eDRX\_INACTIVE}$

Determination of the paging monitoring cycle in NR can be summarized as Table 7 and Table 8 below.

TABLE 7

| UE in RRC_IDLE mode | | |
|---|---|---|
| $T_{eDRX\_IDLE}$ is not configured | $T_{eDRX\_IDLE}$ ≤ 10.24 s | $T_{eDRX\_IDLE}$ > 10.24 s |
| min (UE specific, default) | $T_{eDRX\_IDLE}$ | During PTW, min (UE specific, default)<br>Outside PTW, No monitoring |

TABLE 8

| UE in RRC_INACTIVE mode | | | |
|---|---|---|---|
| | $T_{eDRX\_IDLE}$ is not configured | $T_{eDRX\_IDLE}$ ≤ 10.24 s | $T_{eDRX\_IDLE}$ > 10.24 s |
| $T_{eDRX\_INACTIVE}$ is not configured | min (UE specific, default, RAN) | min (RAN, $T_{eDRX\_IDLE}$) | During PTW, min (UE specific, default, RAN)<br>Outside PTW, RAN |
| $T_{eDRX\_INACTIVE}$ ≤ 10.24 s | Invalid configuration | min ($T_{eDRX\_IDLE}$, $T_{eDRX\_INACTIVE}$) | During PTW, min (default, UE specific, $T_{eDRX\_INACTIVE}$)<br>Outside PTW, $T_{eDRX\_INACTIVE}$ |
| TeDRX_INACTIVE > 10.24 s | Invalid configuration | Invalid configuration | Invalid configuration |

The following is an excerpt from the description of system information update in LTE's standard document TS 36.331 and NR's RRC running CR.

LTE: TS 36.331, V16.6.0

| 5.3.2.3 Reception of the Paging message by the UE |
|---|
| Upon receiving the Paging message, the UE shall;<br>(생략...)<br>1> if the UE is not configured with a DRX cycle longer than the modification period and the systemInfoModification is included; or<br>1> if the UE is configured with a DRX cycle longer than the modification period and the systemInfoModification-εDRX is included:<br>2> re-acquire the required system information using the system information acquisition procedure as specified in 5.2.2;<br>(생략...) |

| 5.2.2.4 System information acquisition by the UE |
|---|
| The UE shall:<br>1> apply the specified BCCH configuration defined in 9.1.1.1 or BR-BCCH configuration defined in 9.1.1.8;<br>1> if the procedure is triggered by a system information change notification:<br>2> if the UE uses an idle DRX cycle longer than the modification period: |

NR: RedCap RRC running CR, R2-2111620

*Running CR endorsed in RAN2 WG email discussion [Post116-e][107][RedCap] RRC running CR (Ericsson)

| 5.2.2.2.2 SI change indication and PWS notification |
|---|
| (생략...)<br>1> if the UE is not configured with a eDRX cycle longer than the modification period and the systemInfoModification bit of Short Message is set:<br>2> apply the SI acquisition procedure as defined in sub-clause 5.2.2.3 from the start of the next modification period; |

-continued

| 5.2.2.2.2 SI change indication and PWS notification |
|---|
| 1> if the UE is in RRC_IDLE, configured with a eDRX cycle longer than the modification period and the systemInfoModification-eDRX bit of Short Message is set: |
| 2> apply the SI acquisition procedure as defined in sub-clause 5.2.2.3 from the start of the next eDRX acquisition period boundary. |

The problems of the prior art that the disclosure seeks to solve are as follows.

Problem 1. In the case of LTE (according to TS 36.331 excerpted above), in "configured with a DRX cycle longer . . . " and "idle DRX cycle longer . . . ", it is unclear whether a DRX cycle refers to 1) a DRX cycle including the eDRX cycle or 2) a DRX cycle excluding the eDRX cycle. In addition, either interpretation may cause the following problems.

Problem of interpretation 1): As explained in FIG. 9, in the case of the RRC_IDLE UE with eDRX configured, the maximum period during which paging is not monitored is the eDRX cycle ($T_{eDRX}$), so a method of determining the time to update the system information by comparing the eDRX cycle with the modification period through interpretation 1) can be used correctly for the RRC_IDLE UE. However, according to Table 5, in the case of the RRC_INACTIVE UE, when the eDRX is configured, the maximum period during which paging is not monitored may be the RAN paging cycle. Therefore, when the RAN paging cycle is configured, the correct method for the RRC_INACTIVE UE may be to determine the time to update the system information by comparing the RAN paging cycle, not the eDRX cycle, with the modification period. If the RRC_INACTIVE UE determines the system information update time by comparing the eDRX cycle (generally a longer cycle than the RAN paging cycle) with the modification period, this may cause unnecessary delay in system information update.

Problem of interpretation 2): Contrary to interpretation 1), in the case of the RRC_IDLE UE with eDRX configured, the maximum period during which paging is not monitored is the eDRX cycle ($T_{eDRX}$), so if a method of determining the time to update the system information by comparing a DRX value other than the eDRX cycle with the modification period through analysis 2) is used, the RRC_IDLE UE may miss the system information update.

Problem 2. In the case of LTE (according to TS 36.331 extracted above), in "configured with a DRX cycle longer than the modification period", there may be a plurality of configured DRXs. In other words, it is not clear whether the DRX value that should be compared to the modification period is the UE specific DRX cycle, the default DRX cycle, the RAN paging cycle, or the eDRX cycle.

Problem 3. In the case of LTE (according to Table 5), if the eDRX cycle is greater than 5.12 seconds (if it is not the same), the paging monitoring cycles may be different inside and outside the PTW. Therefore, it may be efficient to distinguish the inside and outside of the PTW and compare each of different monitoring cycles with the modification period.

Problem 4. In the case of NR (according to the running CR extracted above), the modification period is compared with the eDRX cycle through "configured with a eDRX cycle longer than the modification period." However, for the RRC_INACTIVE UE, it is unclear whether this eDRX cycle means $T_{eDRX\_IDLE}$ Or $T_{eDRX\_INACTIVE}$.

In addition, even if it means a specific value among the above two values, according to Table 6, the maximum period during which the UE does not monitor paging may be different from the two eDRX cycles. For example, if $T_{eDRX\_IDLE}$ is 10.24 seconds and $T_{eDRX\_INACTIVE}$ is not configured, the maximum period during which the RRC_INACTIVE UE does not monitor paging is the RAN paging cycle. Therefore, in this case, it may be efficient to compare the RAN paging cycle and the modification period. Otherwise, comparing the eDRX cycle (generally a longer cycle than the RAN paging cycle) and the modification period may cause unnecessary delays when updating the system information.

Problem 5. In the case of NR (according to Table 6), if the eDRX cycle is greater than 10.24 seconds (if it is not the same), the paging monitoring cycles may be different inside and outside the PTW. Therefore, it may be efficient to distinguish the inside and outside of the PTW and compare each of different monitoring cycles with the modification period.

Figure 10A:
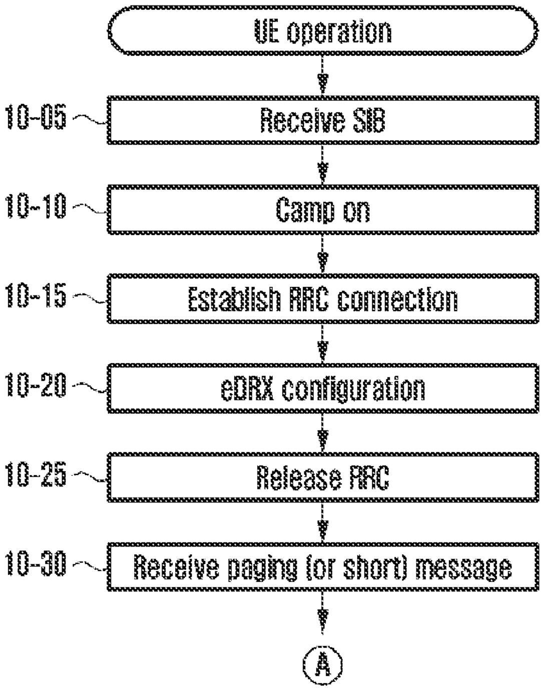
FIGS. 10A, 10B, and 10C are diagrams illustrating a process for determining the time when a UE updates system information, according to an embodiment of the disclosure.
Figure 10B:
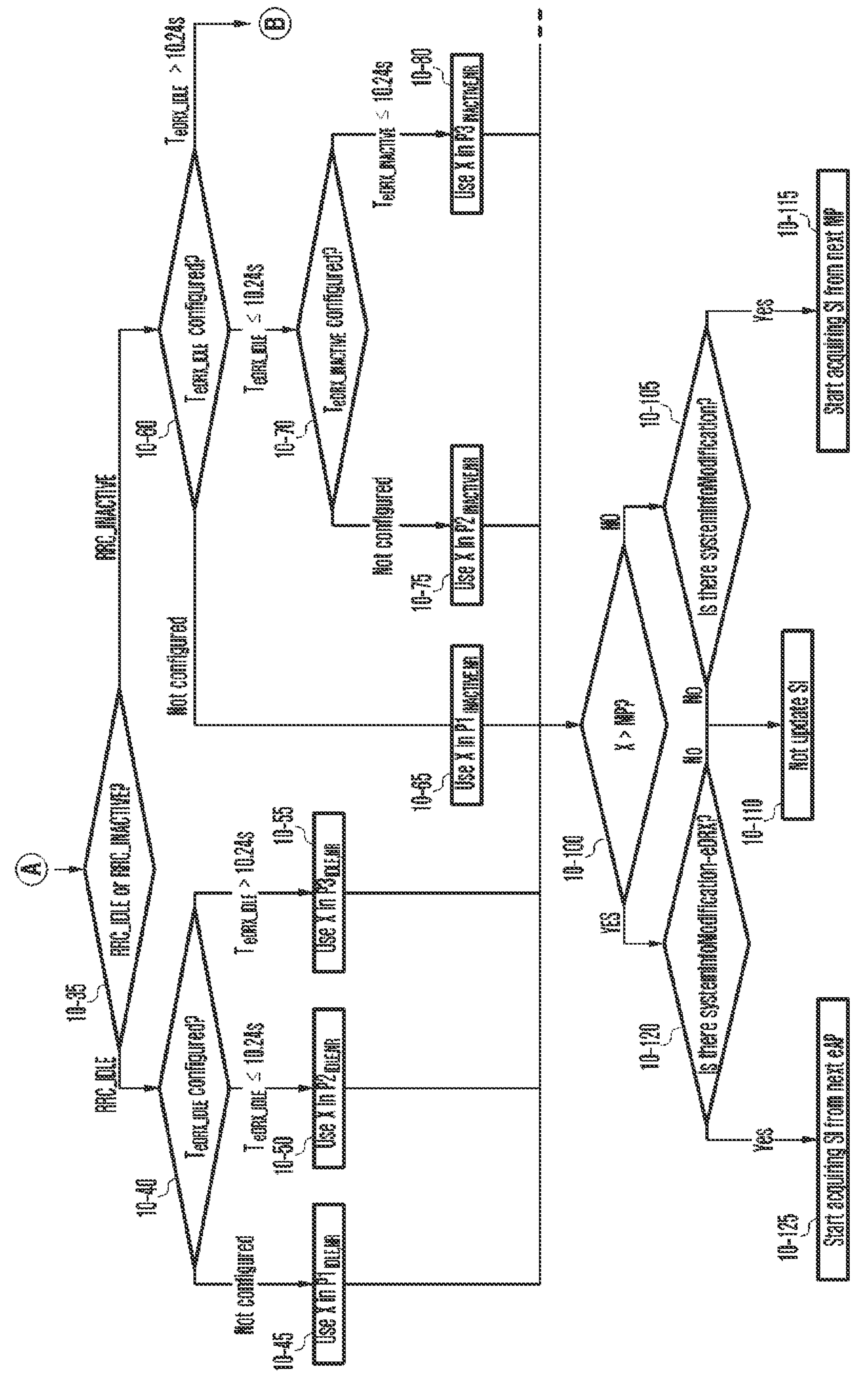
Figure 10C:
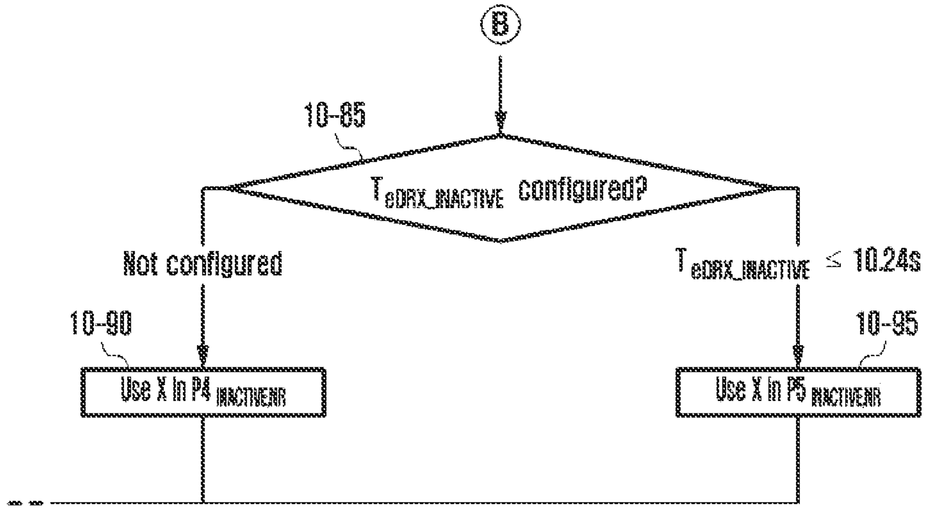

FIGS. 10A, 10B, and 10C are diagrams illustrating a process for determining the time when a UE updates system information, according to an embodiment of the disclosure. Hereinafter, FIGS. 10A, 10B, and 10C are collectively referred to as FIG. 10.

In step 10-05, the UE may receive system information (system information block, SIB). In step 10-10, the UE may select one cell based on the received (single or plural) system information and camp on to the selected cell. Then, in step 10-15, the UE may establish an RRC connection with the cell. In step 10-20, the UE that transitions to the RRC connected mode may receive eDRX configuration from the CN through negotiation using NAS signaling (e.g., Attach request/accept, Tracking area update request/accept message) with the CN (the MME or the AMF). The eDRX configuration from the CN may include an RRC_IDLE eDRX cycle ($T_{eDRX\_IDLE}$). Additionally, the UE in connected mode may receive eDRX configuration from the RAN (or base station), which may include an RRC_INACTIVE eDRX cycle ($T_{eDRX\_INACTIVE}$).

In step 10-25, the RRC connection of the UE is released, and the UE may transition an RRC mode to the idle mode (RRC_IDLE) or the inactive mode (RRC_INACTIVE). In step 10-30, the UE may receive a paging message (short message in NR). In step 10-35, the UE may determine whether it is in the idle mode or the inactive mode.

If it is determined in step 10-35 that the UE is in the idle mode, the UE may determine in step 10-40 whether $T_{eDRX\_IDLE}$ is configured. If $T_{eDRX\_IDLE}$ or idle mode eDRX configuration is not configured, the UE may use, in step 10-45, X (the value compared in step 10-100 to the modification period to determine the system information update time) as one of embodiments of $P1_{IDLE,NR}$ (proposal for Case $1_{IDLE,NR}$) described below. If $T_{eDRX\_IDLE}$ is configured to be not greater than 10.24 seconds in step 10-40, the UE may use, in step 10-50, X as one of embodiments of $P2_{IDLE,NR}$ (proposal for Case $2_{IDLE,NR}$) described below. If $T_{eDRX\_IDLE}$ is configured to be greater than 10.24 seconds in step 10-40, the UE may use, in step 10-55, X as one of embodiments of $P3_{IDLE,NR}$ (proposal for Case $3_{IDLE,NR}$) described below.

If it is determined in step 10-35 that the UE is in the inactive mode, the UE may determine in step 10-60 whether $T_{eDRX\_IDLE}$ is configured. If $T_{eDRX\_IDLE}$ or idle mode eDRX configuration is not configured, the UE may use, in step 10-65, X as one of embodiments of $P1_{INACTIVE,NR}$ (proposal for Case $1_{INACTIVE,NR}$) described below. If $T_{eDRX\_IDLE}$ is configured to be not greater than 10.24 seconds in step 10-60, the UE may determine in step 10-70 whether $T_{eDRX\_INACTIVE}$ is configured. If $T_{eDRX\_INACTIVE}$ or inactive mode eDRX configuration is not configured, the UE may use, in step 10-75, X as one of embodiments of $P2_{INACTIVE,NR}$ (proposal for Case $2_{INACTIVE,NR}$) described below. If $T_{eDRX\_INACTIVE}$ is configured to be not greater than 10.24 seconds in step 10-70, the UE may use, in step 10-80, X as one of embodiments of $P3_{INACTIVE,NR}$ (proposal for Case $3_{INACTIVE,NR}$) described below. If $T_{eDRX\_IDLE}$ is configured to be greater than 10.24 seconds in step 10-60, the UE may determine in step 10-85 whether $T_{eDRX\_INACTIVE}$ is configured. If $T_{eDRX\_INACTIVE}$ or inactive mode eDRX configuration is not configured, the UE may use, in step 10-90, X as one of embodiments of $P4_{INACTIVE,NR}$ (proposal for Case $4_{INACTIVE,NR}$) described below. If $T_{eDRX\_INACTIVE}$ is configured to be not greater than 10.24 seconds in step 10-85, the UE may use, in step 10-95, X as one of embodiments of $P5_{INACTIVE,NR}$ (proposal for Case $5_{INACTIVE,NR}$) described below.

First embodiment of $P1_{IDLE,NR}$: A method of using the DRX cycle in use when the UE receives a short message or determines a system information update time. In Case $1_{IDLE,NR}$, the paging monitoring cycle of the idle mode UE, $T_{DRX\_IDLE,NR}$, may be min (UE specific paging cycle, Default paging cycle). If the DRX cycle in use when the UE receives a short message or determines a system information update time is the UE specific paging cycle, X may be the UE specific paging cycle. If the DRX cycle in use when the UE receives a short message or determines a system information update time is the default paging cycle, X may be the default paging cycle.

Second embodiment of $P1_{IDLE,NR}$: X may be the UE specific paging cycle.

Third embodiment of $P1_{IDLE,NR}$: X may be the default paging cycle.

Fourth embodiment of $P1_{IDLE,NR}$: X may be max (UE specific paging cycle, default paging cycle). The max function represents a function that outputs the larger value among input values (if configured).

First embodiment of $P2_{IDLE,NR}$: A method of using the DRX cycle in use when the UE receives a short message or determines a system information update time. In Case $2_{IDLE,NR}$, the paging monitoring cycle of the idle mode UE, $T_{DRX\_IDLE,NR}$, may be $T_{eDRX\_IDLE}$. Therefore, X may be $T_{eDRX\_IDLE}$.

First embodiment of $P3_{IDLE,NR}$: A method of using the DRX cycle in use when the UE receives a short message or determines a system information update time. In Case $3_{IDLE,NR}$, the paging monitoring cycle of the idle mode UE, $T_{DRX\_IDLE,NR}$, may be min (UE specific paging cycle, Default paging cycle) inside the PTW, and paging monitoring may not be performed outside the PTW. If the DRX cycle in use when the UE receives a short message or determines a system information update time inside the PTW is the UE specific paging cycle, X may be the UE specific paging cycle. If the DRX cycle in use when the UE receives a short message or determines a system information update time inside the PTW is the default paging cycle, X may be the default paging cycle. However, the first paging monitoring occasion inside the PTW may be an exception. Before the first paging monitoring inside the PTW, paging monitoring may not be performed since it is outside the PTW, and thus system information update from the base station may be missed during the above interval (outside the PTW). Therefore, when receiving a short message or determining a system information update time on the first paging monitoring occasion inside the PTW, the UE may use, as the X value, the length of the outside of the PTW ($T_{eDRX,IDLE}$–PTW length, 9-25) or a similar value $T_{eDRX,IDLE}$ 9-20 rather than the DRX cycle in use.

Second embodiment of $P3_{IDLE,NR}$: A method of using the longest interval in which the UE does not monitor paging throughout the inside and outside of the PTW. In Case $3_{IDLE,NR}$, the paging monitoring cycle of the idle mode UE, $T_{DRX\_IDLE,NR}$, may be min (UE specific paging cycle, Default paging cycle) inside the PTW, and paging monitoring may not be performed outside the PTW. Therefore, the length of the outside of the PTW ($T_{eDRX,IDLE}$–PTW length, 9-25), which is the longest interval in which paging is not monitored, or a similar value $T_{eDRX,IDLE}$ 9-20 may be used as the value of X.

Third embodiment of $P3_{IDLE,NR}$: X may be the UE specific paging cycle.

Fourth embodiment of $P3_{IDLE,NR}$: X may be the default paging cycle.

Fifth embodiment of $P3_{IDLE,NR}$: X may be max (UE specific paging cycle, default paging cycle).

First embodiment of $P1_{INACTIVE,NR}$: A method of using the DRX cycle in use when the UE receives a short message or determines a system information update time.

In Case $1_{INACTIVE,NR}$, the paging monitoring cycle of the inactive mode UE, $T_{DRX\_INACTIVE,NR}$, may be min (UE specific paging cycle, Default paging cycle, RAN paging cycle). If the DRX cycle in use when the UE receives a short message or determines a system information update time is the UE specific paging cycle, X may be the UE specific paging cycle. If the DRX cycle in use when the UE receives a short message or determines a system information update time is the default paging cycle, X may be the default paging cycle. If the DRX cycle in use when the UE receives a short message or determines a system information update time is the RAN paging cycle, X may be the RAN paging cycle.

Second embodiment of $P1_{INACTIVE,NR}$: X may be the UE specific paging cycle.

Third embodiment of $P1_{INACTIVE,NR}$: X may be the default paging cycle.

Fourth embodiment of $P1_{INACTIVE,NR}$: X may be the RAN paging cycle.

Fifth embodiment of $P1_{INACTIVE,NR}$: X may be max (UE specific paging cycle, default paging cycle, RAN paging cycle).

First embodiment of $P2_{INACTIVE,NR}$: A method of using the DRX cycle in use when the UE receives a short message or determines a system information update time.

In Case $2_{INACTIVE,NR}$, the paging monitoring cycle of the inactive mode UE, $T_{DRX\_INACTIVE,NR}$, may be min ($T_{eDRX\_IDLE}$, RAN paging cycle). If the DRX cycle in use when the UE receives a short message or determines a system information update time is $T_{eDRX\_IDLE}$, X may be $T_{eDRX\_IDLE}$. If the DRX cycle in use when the UE receives a short message or determines a system information update time is the RAN paging cycle, X may be the RAN paging cycle.

Second embodiment of $P2_{INACTIVE,NR}$: X may be $T_{eDRX\_IDLE}$.

Third embodiment of $P2_{INACTIVE,NR}$: X may be the RAN paging cycle.

Fourth embodiment of $P2_{INACTIVE,NR}$: X may be max ($T_{eDRX\_IDLE}$, RAN paging cycle).

First embodiment of $P3_{INACTIVE,NR}$: A method of using the DRX cycle in use when the UE receives a short message or determines a system information update time.

In Case $3_{INACTIVE,NR}$, the paging monitoring cycle of the inactive mode UE, $T_{DRX\_INACTIVE,NR}$, may be min ($T_{eDRX\_IDLE}$, $T_{eDRX\_INACTIVE}$). If the DRX cycle in use when the UE receives a short message or determines a system information update time is $T_{eDRX\_IDLE}$, X may be $T_{eDRX\_IDLE}$. If the DRX cycle in use when the UE receives a short message or determines a system information update time is $T_{eDRX\_INACTIVE}$, X may be $T_{eDRX\_INACTIVE}$.

Second embodiment of $P3_{INACTIVE,NR}$: X may be $T_{eDRX\_IDLE}$.

Third embodiment of $P3_{INACTIVE,NR}$: X may be $T_{eDRX\_INACTIVE}$.

Fourth embodiment of $P3_{INACTIVE,NR}$: X may be max ($T_{eDRX\_IDLE}$, $T_{eDRX\_INACTIVE}$).

First embodiment of $P4_{INACTIVE,NR}$: A method of using the DRX cycle in use when the UE receives a short message or determines a system information update time.

In Case $4_{INACTIVE,NR}$, the paging monitoring cycle of the inactive mode UE, $T_{DRX\_INACTIVE,NR}$, may be min (UE specific paging cycle, Default paging cycle, RAN paging cycle) inside the PTW, and may be the RAN paging cycle outside the PTW. If the DRX cycle in use when the UE receives a short message or determines a system information update time inside the PTW is the UE specific paging cycle, X may be the UE specific paging cycle. If the DRX cycle in use when the UE receives a short message or determines a system information update time inside the PTW is the default paging cycle, X may be the default paging cycle. If the DRX cycle in use when the UE receives a short message or determines a system information update time inside the PTW is the RAN paging cycle, X may be the RAN paging cycle. However, the first paging monitoring occasion inside the PTW may be an exception. Before the first paging monitoring inside the PTW, monitoring may be performed with RAN paging cycle since it is outside the PTW. Therefore, when receiving a short message or determining a system information update time on the first paging monitoring occasion inside the PTW, the UE may use, as the X value, the RAN paging cycle rather than the DRX cycle in use. If the DRX cycle in use when the UE receives a short message or determines a system information update time outside the PTW is the RAN paging cycle, X may be the RAN paging cycle. However, the first paging monitoring occasion outside the PTW may be an exception. Before the first paging monitoring outside the PTW, monitoring may be performed based on min (UE specific paging cycle, Default paging cycle, RAN paging cycle) since it is inside the PTW. Therefore, when receiving a short message or determining a system information update time on the first paging monitoring occasion outside the PTW, the UE may configure the value of X with the DRX cycle in use inside the PTW rather than the RAN paging cycle.

Second embodiment of $P4_{INACTIVE,NR}$: A method of using the longest interval in which the UE does not monitor paging throughout the inside and outside of the PTW. In Case $4_{INACTIVE,NR}$, the paging monitoring cycle of the inactive mode UE, $T_{DRX\_INACTIVE,NR}$, may be min (UE specific paging cycle, Default paging cycle, RAN paging cycle) inside the PTW, and may be the RAN paging cycle outside the PTW. Since the RAN paging cycle may always be greater than or equal to min (UE specific paging cycle, Default paging cycle, RAN paging cycle), the longest interval during which the UE does not monitor paging is the RAN paging cycle, and this may be used as the value of X.

Second embodiment of $P4_{INACTIVE,NR}$: X may be $T_{eDRX\_IDLE}$.

Third embodiment of $P4_{INACTIVE,NR}$: X may be the UE specific paging cycle.

Fourth embodiment of $P4_{INACTIVE,NR}$: X may be the default paging cycle.

Fifth embodiment of $P4_{INACTIVE,NR}$: X may be max (UE specific paging cycle, default paging cycle, RAN paging cycle).

First embodiment of $P5_{INACTIVE,NR}$: A method of using the DRX cycle in use when the UE receives a short message or determines a system information update time.

In Case $5_{INACTIVE,NR}$, the paging monitoring cycle of the inactive mode UE, $T_{DRX\_INACTIVE,NR}$, may be min (UE specific paging cycle, Default paging cycle, $T_{eDRX\_INACTIVE}$) inside the PTW, and may be $T_{eDRX\_INACTIVE}$ outside the PTW. If the DRX cycle in use when the UE receives a short message or determines a system information update time inside the PTW is the UE specific paging cycle, X may be the UE specific paging cycle. If the DRX cycle in use when the UE receives a short message or determines a system information update time inside the PTW is the default paging cycle, X may be the default paging cycle. If the DRX cycle in use when the UE receives a short message or determines a system information update time inside the PTW is $T_{eDRX\_INACTIVE}$, X may be $T_{eDRX\_INACTIVE}$. However, the first paging monitoring occasion inside the PTW may be an exception. Before the first paging monitoring inside the PTW, monitoring may be performed with $T_{eDRX\_INACTIVE}$ because it is outside the PTW. Therefore, when receiving a short message or determining a system information update time on the first paging monitoring occasion inside the PTW, the UE may use, as the X value, $T_{eDRX\_INACTIVE}$ rather than the DRX cycle in use. If the DRX cycle in use when the UE receives a short message or determines a system information update time outside the PTW is the RAN paging cycle, X may be the RAN paging cycle. However, the first paging monitoring occasion outside the PTW may be an exception. Before the first paging monitoring outside the PTW, monitoring may be performed based on min (UE specific paging cycle, Default paging cycle, $T_{eDRX\_INACTIVE}$) since it is inside the PTW. Therefore, when receiving a short message or determining a system information update time on the first paging monitoring occasion outside the PTW, the UE may configure the value of X with the DRX cycle in use inside the PTW (one of UE specific paging cycle, Default paging cycle, $T_{eDRX\_INACTIVE}$) rather than $T_{eDRX\_INACTIVE}$.

Second embodiment of $P5_{INACTIVE,NR}$: A method of using the longest interval in which the UE does not monitor paging throughout the inside and outside of the PTW. In Case $5_{INACTIVE,NR}$, the paging monitoring cycle of the inactive mode UE, $T_{DRX\_INACTIVE,NR}$, may be min (UE specific paging cycle, Default paging cycle, $T_{eDRX\_INACTIVE}$) inside the PTW, and may be $T_{eDRX\_INACTIVE}$ outside the PTW. Since $T_{eDRX\_INACTIVE}$ may always be greater than or equal to min (UE specific paging cycle, Default paging cycle, $T_{eDRX\_INACTIVE}$), the longest interval during which the UE does not monitor paging is $T_{eDRX\_INACTIVE}$, and this may be used as the value of X.

Second embodiment of $P5_{INACTIVE,NR}$: X may be $T_{eDRX\_IDLE}$.

Third embodiment of $P5_{INACTIVE,NR}$: X may be the UE specific paging cycle.

Fourth embodiment of $P5_{INACTIVE,NR}$: X may be the default paging cycle.

Fifth embodiment of $P5_{INACTIVE,NR}$: X may be max (UE specific paging cycle, default paging cycle, $T_{eDRX\_INACTIVE}$).

X is determined through steps 10-45, 10-50, 10-55, 10-65, 10-75, 10-80, 10-90, or 10-95, and in step 10-100, the UE compares the determined X value with the modification period (MP). If X is not longer than the modification period, the UE may check in step 10-105 whether a systemInfo-Modification indicator is configured in the received paging message (short message in NR). If the systemInfoModification indicator is not configured, the UE may not update the system information in step 10-110. If the systemInfoModification indicator is configured, the UE may start updating the necessary system information from the next MP in step 10-115.

If X is greater than the modification period in step 10-100, the UE may check in step 10-120 whether a systemInfo-Modification-eDRX indicator is configured in the received paging message (short message in NR). If the systemInfo-Modification-eDRX indicator is not configured, the UE may not update the system information in step 10-110. If the systeminfoModification-eDRX indicator is configured, the UE may start updating the necessary system information from the next eAP in step 10-125.

In the case where $P1_{IDLE,NR}$, $P2_{IDLE,NR}$, $P3_{IDLE,NR}$, $P1_{INACITVE,NR}$, $P2_{INACITVE,NR}$, $P3_{INACITVE,NR}$, $P4_{INACITVE,NR}$, and $P5_{INACITVE,NR}$ commonly apply the first embodiment (that is, a method of using the DRX cycle in use when the UE receives a short message or determines a system information update time), NR running CR can be updated as follows.

---

5.2.2.2.2 SI change indication and PWS notification

---

(생략...)

1> if ~~the UE is not configured with a eDRX cycle longer than the modification period~~ DRX cycle (T) UE is using according to TS 38.304 is not longer than modification period and the systemInfoModification bit of Short Message is set:

2> apply the SI acquisition procedure as defined in sub-clause 5.2.2.3 from the start of the next modification period;

1> if ~~the UE is in RRC_IDLE, configured with a eDRX cycle longer than the modification period~~ DRX cycle (T) UE is using according to TS 38.304 is not longer than modification period and the systemInfoModification-eDRX bit of Short Message is set:

2> apply the SI acquisition procedure as defined in sub-clause 5.2.2.3 from the start of the next eDRX acquisition period boundary.

---

In the case where $P1_{IDLE,NR}$, $P2_{IDLE,NR}$, $P1_{INACTIVE,NR}$, $P2_{INACTIVE,NR}$, and $P3_{INACTIVE,NR}$ apply the first embodiment (that is, a method of using the DRX cycle in use when the UE receives a short message or determines a system information update time), and $P3_{IDLE,NR}$, $P4_{INACTIVE,NR}$, and $P5_{INACITVE,NR}$ apply the second embodiment (that is, a method of using the longest interval in which the UE does not monitor paging throughout the inside and outside of the PTW), NR running CR can be updated as follows.

---

5.2.2.2.2 SI change indication and PWS notification

---

(생략...)

1> if ~~the UE is not configured with a eDRX cycle longer than the modification period~~ all of the DRX cycle (T) determined for monitoring paging according to TS 38.304 is not longer than modification period and the systemInfoModification bit of Short Message is set:

2> apply the SI acquisition procedure as defined in sub-clause 5.2.2.3 from the start of the next modification period;

2> if ~~the UE is in RRC_IDLE, configured with a eDRX cycle longer than the modification period~~ at least one of the DRX cycle (T) determined for monitoring paging according to TS 38.304 is longer than modification period and the systemInfoModification-eDRX bit of Short Message is set:

2> apply the SI acquisition procedure as defined in sub-clause 5.2.2.3 from the start of the next eDRX acquisition period boundary.

---

Figure 11:
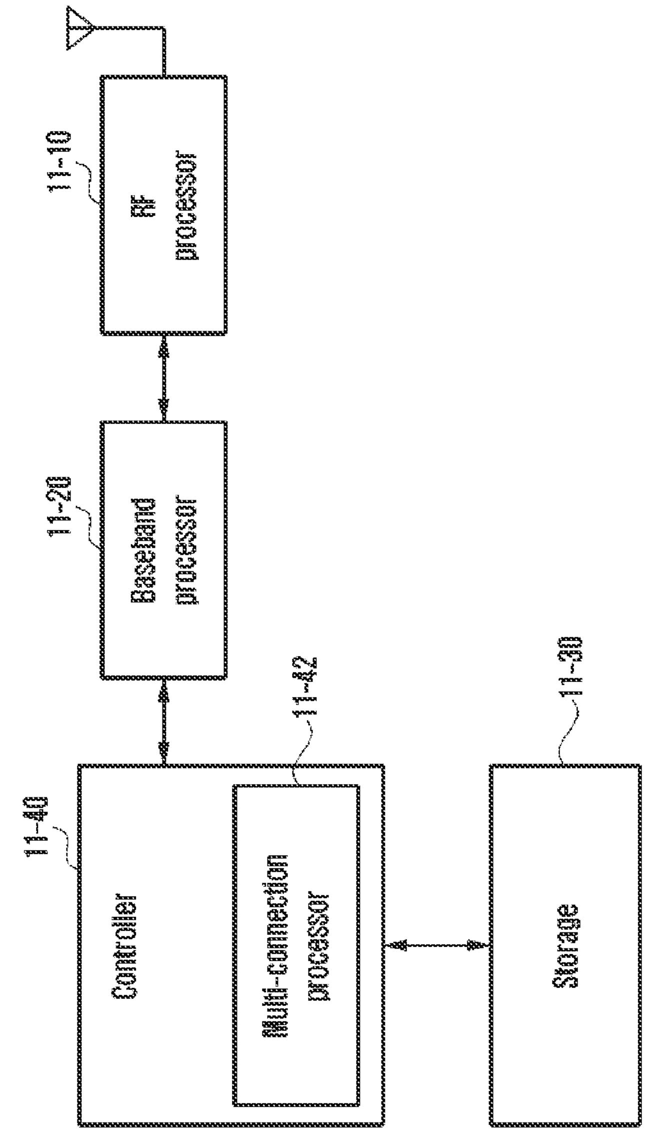
FIG. 11 is a diagram illustrating a UE device according to an embodiment of the disclosure.

FIG. 11 is a diagram illustrating a UE device according to an embodiment of the disclosure.

With reference to FIG. IF, the UE may include a radio frequency (RF) processor 11-10, a baseband processor 11-20, a storage 11-30, and a controller 11-40. Components of the UE are not limited to the example shown in FIG. 11, and may include fewer components or more components than the components shown in FIG. 11.

The RF processor 11-10 may perform functions for transmitting and receiving signals through a wireless channel, such as band conversion and amplification of signals. For example, the RF processor 11-10 may up-convert a baseband signal provided from the baseband processor 11-20 into an RF band signal, transmit the RF band signal through an antenna, and down-convert an RF band signal received through the antenna into a baseband signal. For example, the RF processor 11-10 may include, but is not limited to, a transmit filter, a receive filter, an amplifier, a mixer, an oscillator, a digital to analog converter (DAC), an analog to digital converter (ADC), and the like. Although only one antenna is shown in FIG. 11, the UE may include a plurality of antennas. Also, the RF processor 11-10 may include a plurality of RF chains. Furthermore, the RF processor 11-10 may perform beamforming. For the beamforming, the RF processor 11-10 may adjust the phase and magnitude of signals transmitted or received through a plurality of antennas or antenna elements. Also, the RF processor may perform multiple-input and multiple-output (MIMO) and may receive multiple layers when performing the MIMO operation.

The baseband processor 11-20 may perform a conversion function between a baseband signal and a bit stream in accordance with the physical layer standard of the system. For example, upon data transmission, the baseband processor 11-20 may generate complex symbols by encoding and modulating a transmission bit stream. In addition, upon data reception, the baseband processor 11-20 may restore a received bit stream by demodulating and decoding baseband signals provided from the RF processor 11-10. For example, in the case of orthogonal frequency division multiplexing (OFDM) scheme, upon data transmission, the baseband processor 11-20 may generate complex symbols by encoding and modulating a transmission bit stream, map the complex symbols to subcarriers, and configure OFDM symbols through an inverse fast Fourier transform (IFFT) operation and a cyclic prefix (CP) insertion. In addition, upon data reception, the baseband processor 11-20 may divide baseband signals provided from the RF processor 11-10 into OFDM symbol units, restore signals mapped to subcarriers through a fast Fourier transform (FFT) operation, and restore a received bit stream through demodulation and decoding.

The baseband processor 11-20 and the RF processor 11-10 may transmit and receive signals as described above. Accordingly, the baseband processor 11-20 and the RF processor 11-10 may be referred to as a transmitter, a receiver, a transceiver, or a communication unit. Furthermore, at least one of the baseband processor 11-20 and the RF processor 11-10 may include a plurality of communication modules to support a plurality of different radio access technologies. In addition, at least one of the baseband processor 11-20 and the RF processor 11-10 may include different communication modules to process signals of different frequency bands. For example, the different radio access technologies may include a wireless LAN (e.g., IEEE 802.11), a cellular network (e.g., LTE), and the like. In addition, the different frequency bands may include a super high frequency (SHF) (e.g., 2. NRHz, NRhz) band and a millimeter wave (e.g., 60 GHz) band. The UE may transmit and receive signals to and from the base station using the baseband processor 11-20 and the RF processor 11-10, and the signals may include control information and data.

The storage 11-30 may store a default program for operation of the UE, an application program, and data such as configuration information. Also, the storage 11-30 may provide the stored data in response to the request of the controller 11-40.

The storage 11-30 may be composed of a storage medium such as ROM, RAM, hard disk, CD-ROM, and DVD, or a combination of such storage media. In addition, the storage 11-30 may be composed of a plurality of memories. According to an embodiment of the disclosure, the storage 11-30 may store a program for performing the handover method according to the disclosure.

The controller 11-40 may control the overall operations of the UE. For example, the controller 11-40 may transmit and receive signals through the baseband processor 11-20 and the RF processor 11-10.

In addition, the controller 11-40 may write and read data in and from the storage 11-30. To this end, the controller 11-40 may include at least one processor. For example, the controller 11-40 may include a communication processor (CP) for controlling communication and an application processor (AP) for controlling a higher layer such as an application program. Also, according to an embodiment of the disclosure, the controller 11-40 may include a multi-connection processor 11-42 configured to handle a process operating in a multi-connection mode. Additionally, at least one component in the UE may be implemented with one chip.

Figure 12:
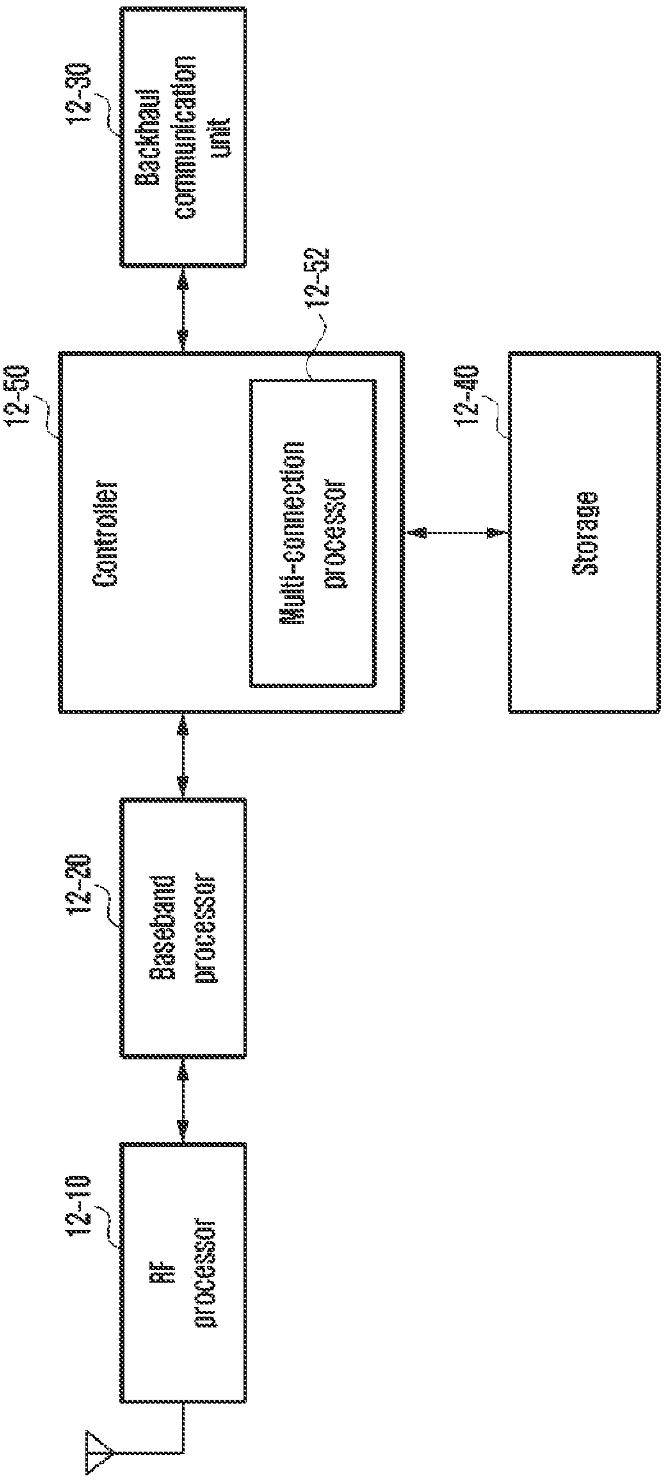
FIG. 12 is a diagram illustrating a base station device according to an embodiment of the disclosure.

FIG. 12 is a diagram illustrating a base station device according to an embodiment of the disclosure.

The base station in FIG. 12 may be included in the network described above. As shown in FIG. 12, the base station may include an RF processor 12-10, a baseband processor 12-20, a backhaul communication unit 12-30, a storage 12-40, and a controller 12-50. Components of the base station are not limited to the example shown in FIG. 12, and may include fewer components or more components than the components shown in FIG. 12. The RF processor 12-10 may perform functions for transmitting and receiving signals through a wireless channel, such as band conversion and amplification of signals. For example, the RF processor 12-10 may up-convert a baseband signal provided from the baseband processor 12-20 into an RF band signal, transmit the RF band signal through an antenna, and down-convert an RF band signal received through the antenna into a baseband signal. For example, the RF processor 12-10 may include a transmit filter, a receive filter, an amplifier, a mixer, an oscillator, a DAC, an ADC, and the like. Although only one antenna is shown in FIG. 12, the RF processor 12-10 may include a plurality of antennas. Also, the RF processor 12-10 may include a plurality of RF chains. Furthermore, the RF processor 12-10 may perform beamforming. For the beamforming, the RF processor 12-10 may adjust the phase and magnitude of signals transmitted and received through a plurality of antennas or antenna elements. The RF processor 12-10 may perform downward MIMO operation by transmitting one or more layers.

The baseband processor 12-20 may perform a conversion function between a baseband signal and a bit stream in accordance with the physical layer standard of the first radio access technology. For example, upon data transmission, the baseband processor 12-20 may generate complex symbols by encoding and modulating a transmission bit stream. In addition, upon data reception, the baseband processor 12-20 may restore a received bit stream by demodulating and decoding baseband signals provided from the RF processor 12-10. For example, in the case of complying with the OFDM scheme, upon data transmission, the baseband processor 12-20 may generate complex symbols by encoding and modulating a transmission bit stream, map the complex symbols to subcarriers, and configure OFDM symbols through an IFFT operation and a CP insertion. In addition, upon data reception, the baseband processor 12-20 may divide baseband signals provided from the RF processor 12-10 into OFDM symbol units, restore signals mapped to subcarriers through an FFT operation, and restore a received bit stream through demodulation and decoding. The baseband processor 12-20 and the RF processor 12-10 may transmit and receive signals as described above. Accordingly, the baseband processor 12-20 and the RF processor 12-10 may be referred to as a transmitter, a receiver, a transceiver, a communication unit, or a wireless communication unit. The base station may transmit and receive signals to and from the UE using the baseband processor 12-20 and the RF processor 12-10, and the signals may include control information and data.

The backhaul communication unit 12-30 may provide an interface for communicating with other nodes in the network. That is, the backhaul communication unit 12-30 may convert a bit stream transmitted from the main base station to another node, for example, a secondary base station, a core network, etc. into a physical signal, and convert a physical signal received from the other node into a bit stream.

The storage 12-40 may store a default program for operation of the main base station, an application program, and data such as configuration information. For example, the storage 12-40 may store information about bearers assigned to the connected UE, measurement results reported from the connected UE, etc. Additionally, the storage 12-40 may store information used as a criterion for determining whether to provide or suspend multiple connections to the UE. Also, the storage 12-40 may provide the stored data in response to the request of the controller 12-50. The storage 12-40 may be composed of a storage medium such as ROM, RAM, hard disk, CD-ROM, and DVD, or a combination of such storage media. In addition, the storage 12-40 may be composed of a plurality of memories. According to an embodiment of the disclosure, the storage 12-40 may store a program for performing the handover method according to the disclosure.

The controller 12-50 may control the overall operations of the main base station. For example, the controller 12-50 may transmit and receive signals through the baseband processor 12-20 and the RF processor 12-10 or through the backhaul communication unit 12-30. In addition, the controller 12-50 may write and read data in and from the storage 12-40. To this end, the controller 12-50 may include at least one processor. Also, according to an embodiment of the disclosure, the controller 12-50 may include a multi-connection processor 12-52 configured to handle a process operating in a multi-connection mode.

The methods according to embodiments set forth in claims or specification of the disclosure may be implemented in the form of hardware, software, or a combination thereof.

When implemented in software, a computer readable storage medium storing one or more programs (software modules) may be provided. One or more programs stored in the computer readable storage medium are configured for execution by one or more processors in an electronic device. One or more programs include instructions for causing an electronic device to execute methods according to embodiments described in claims or specifications of the disclosure.

Such programs (software modules, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), other types of optical storage devices, or magnetic cassettes. Alternatively, such programs may be stored in a memory configured with a combination of some or all thereof. Further, each configuration memory may be included in the plural. Further, the program may be stored in an attachable storage device that may access through a communication network such as Internet, Intranet, a local area network (LAN), a wide area network (WAN), or a storage area network (SAN), or a communication network configured with a combination thereof. Such a storage device may access to a device implementing an embodiment of the disclosure through an external port. Further, a separate storage device on the communication network may access to the device implementing the embodiment of the disclosure. In the specific embodiments of the disclosure described above, components included in the disclosure are expressed in the singular or the plural according to the presented specific embodiments. However, the singular or plural expression is appropriately selected for the presented situation for convenience of description, and the disclosure is not limited to the singular or plural components, and even if the component is expressed in the plural, the component may be configured with the singular, or even if the component is expressed in the singular, the component may be configured with the plural.

Meanwhile, although specific embodiments have been described in the detailed description of the disclosure, various modifications are possible without departing from the scope of the disclosure. Therefore, the scope of the disclosure should not be limited to the described embodiments, but should be determined by the scope of claims described later and their equivalents. In other words, it is obvious to those skilled in the art that other modifications based on the technical idea of the disclosure can be implemented. Additionally, each embodiment of the disclosure can be operated in combination with each other as needed. For example, a base station and a terminal can be operated by combining some of the methods proposed in the disclosure. Although the embodiments of the disclosure have been presented based on 5G and NR systems, other modifications based on the technical ideas of the embodiments may also be implemented in other systems such as LTE, LTE-A, and LTE-A-Pro systems.

The embodiments disclosed in the specification and drawings are only presented as specific examples to easily explain the technical contents of the disclosure and help the understanding of the disclosure, and it is not intended to limit the scope of the disclosure. Accordingly, it should be interpreted that all changes or modifications derived from the subject matter of the disclosure are included in the scope of various embodiments of the disclosure.

The invention claimed is:

1. A method of a user equipment (UE) in a wireless communication system, the method comprising:

receiving a paging message;

in case that an extended discontinuous reception (eDRX) is configured in the UE, comparing a length of a discontinuous reception (DRX) cycle currently used by the UE and a length of a modification period (MP);

in case that the length of the DRX cycle is not longer than the length of the MP, and a short message contains an indicator related to a system information update, starting a procedure for acquiring system information from a next MP;

in case that a length of an eDRX cycle for an idle state is longer than a predetermined length, comparing a length of a maximum DRX cycle among DRX cycles determined in relation to a paging time window (PTW) and the length of the MP; and in case that the length of the maximum DRX cycle among the DRX cycles determined in relation to the PTW is not longer than the length of the MP, and the short message contains the indicator related to the system information update, starting the procedure for acquiring the system information from the next MP.

2. The method of claim 1, further comprising:

in case that the length of the DRX cycle is longer than the length of the MP, and the short message contains an indicator related to the system information update, starting the procedure for acquiring the system information from a next eDRX acquisition period (eAP).

3. The method of claim 1, further comprising:

in case that a length of at least one of the DRX cycles determined in relation to the PTW is longer than the length of the MP, and the short message contains an indicator related to an eDRX-related system information update, starting the procedure for acquiring the system information from the next eAP.

4. The method of claim 1, wherein:

in case that the UE is in an inactive state, a length of an eDRX cycle for an idle state is less than or equal to a predetermined length, and the eDRX cycle for the inactive state is not configured, the DRX cycle currently used is determined by a shorter value between a radio access network (RAN) paging monitoring cycle and the eDRX cycle, and in case that the UE is in the inactive state, the length of the eDRX cycle for the idle state is less than or equal to the predetermined length, and the eDRX cycle for the inactive state is configured, the DRX cycle currently used is determined by a shorter value between the eDRX cycle for the idle state and the eDRX cycle for the inactive state.

5. The method of claim 1, wherein the DRX cycle determined in relation to the PTW includes a first interval in which paging is not monitored inside the PTW, and a second interval in which paging is not monitored outside the PTW, wherein the first interval is determined based on a UE specific paging cycle and a default paging cycle, and wherein the second interval is determined based on the eDRX cycle for the idle state and a length of the PTW.

6. The method of claim 1, wherein, in case that the UE is in an inactive state, the length of the eDRX cycle for the idle state is greater than the predetermined length, and the eDRX cycle for the inactive state is not configured, the DRX cycle determined in relation to the PTW is a radio access network (RAN) paging monitoring cycle, and wherein, in case that the UE is in the inactive state, the length of the eDRX cycle for the idle state is greater than the predetermined length, and the eDRX cycle for the inactive state is configured, the DRX cycle determined in relation to the PTW is the eDRX cycle for the inactive state.

7. A user equipment (UE) in a wireless communication system, the UE comprising:

a transceiver; and a controller controlling to:

receive a paging message, in case that an extended discontinuous reception (eDRX) is configured in the UE, compare a length of a discontinuous reception (DRX) cycle currently used by the UE and a length of a modification period (MP), in case that the length of the DRX cycle is not longer than the length of the MP, and a short message contains an indicator related to a system information update, start a procedure for acquiring system information from a next MP, in case that a length of an eDRX cycle for an idle state is longer than a predetermined length, compare a length of a maximum DRX cycle among DRX cycles determined in relation to a paging time window (PTW) and the length of the MP, and in case that the length of the maximum DRX cycle among the DRX cycles determined in relation to the PTW is not longer than the length of the MP, and the short message contains the indicator related to the system information update, start the procedure for acquiring the system information from the next MP.

8. The UE of claim 7, wherein the controller controls to:

in case that the length of the DRX cycle is longer than the length of the MP, and the short message contains an indicator related to the system information update, start the procedure for acquiring the system information from a next eDRX acquisition period (eAP).

9. The UE of claim 7, wherein the controller controls to:

in case that a length of at least one of the DRX cycles determined in relation to the PTW is longer than the length of the MP, and the short message contains an indicator related to an eDRX-related system information update, start the procedure for acquiring the system information from the next eAP.

10. The UE of claim 7, wherein:

in case that the UE is in an inactive state, a length of an eDRX cycle for an idle state is less than or equal to a predetermined length, and the eDRX cycle for the inactive state is not configured, the DRX cycle currently used is determined by a shorter value between a radio access network (RAN) paging monitoring cycle and the eDRX cycle, and in case that the UE is in the inactive state, the length of the eDRX cycle for the idle state is less than or equal to the predetermined length, and the eDRX cycle for the inactive state is configured, the DRX cycle currently used is determined by a shorter value between the eDRX cycle for the idle state and the eDRX cycle for the inactive state.

11. The UE of claim 7, wherein the DRX cycle determined in relation to the PTW includes a first interval in which paging is not monitored inside the PTW, and a second interval in which paging is not monitored outside the PTW, wherein the first interval is determined based on a UE specific paging cycle and a default paging cycle, and wherein the second interval is determined based on the eDRX cycle for the idle state and a length of the PTW.

12. The UE of claim 7, wherein, in case that the UE is in an inactive state, the length of the eDRX cycle for the idle state is greater than the predetermined length, and the eDRX cycle for the inactive state is not configured, the DRX cycle determined in relation to the PTW is a radio access network (RAN) paging monitoring cycle, and wherein, in case that the UE is in the inactive state, the length of the eDRX cycle for the idle state is greater than the predetermined length, and the eDRX cycle for the inactive state is configured, the DRX cycle determined in relation to the PTW is the eDRX cycle for the inactive state.

* * * * *